(12) United States Patent
Stankevicius et al.

(10) Patent No.: US 11,591,926 B2
(45) Date of Patent: Feb. 28, 2023

(54) TURBOCHARGER INCLUDING A SWITCHABLE TRIM COMPRESSOR AND PORTED SHROUD

(71) Applicant: BorgWarner Inc., Auburn Hills, MI (US)

(72) Inventors: Jonas Stankevicius, Huddersfield (GB); Sascha Karstadt, Udenheim (DE); Kendall Samuel, Hendersonville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/448,124

(22) Filed: Sep. 20, 2021

(65) Prior Publication Data

US 2022/0090514 A1    Mar. 24, 2022

Related U.S. Application Data

(60) Provisional application No. 63/082,378, filed on Sep. 23, 2020.

(51) Int. Cl.
*F01D 17/14* (2006.01)

(52) U.S. Cl.
CPC ........ *F01D 17/145* (2013.01); *F05D 2220/40* (2013.01); *F05D 2240/14* (2013.01); *F05D 2260/60* (2013.01)

(58) Field of Classification Search
CPC .... F01D 17/145; F01D 25/24; F05D 2220/40; F05D 2240/14; F05D 2260/60
See application file for complete search history.

(56) References Cited

U.S. PATENT DOCUMENTS

| | | |
|---|---|---|
| 3,195,805 A | 7/1965 | Cholvin et al. |
| 3,362,625 A | 1/1968 | Endress |
| 4,122,668 A | 10/1978 | Chou et al. |

(Continued)

FOREIGN PATENT DOCUMENTS

| | | |
|---|---|---|
| CN | 107304709 A | 10/2017 |
| DE | 1426076 A1 | 12/1968 |

(Continued)

OTHER PUBLICATIONS

English language abstract for DE 602 12 760 T2 extracted from espacenet com database on Sep. 12, 2022, 2 pages.

(Continued)

*Primary Examiner* — Jesse S Bogue
(74) *Attorney, Agent, or Firm* — Howard & Howard Attorneys PLLC

(57) ABSTRACT

A turbocharger includes a compressor assembly having a compressor housing defining a ported shroud and a switchable trim compressor. The switchable trim compressor is moveable from an open trim position to a closed trim position, with the closed trim position minimizing a diameter of the air inlet opening and blocking air flow through the ported shroud. The positioning of the switchable trim compressor in the open position increases the diameter of the air inlet opening and allows a recirculation air flow through the ported shroud from an interior of the compressor assembly to a position upstream of the switchable trim compressor at a position near the air inlet opening.

19 Claims, 14 Drawing Sheets

(56) References Cited

U.S. PATENT DOCUMENTS

| | | | |
|---|---|---|---|
| 4,893,225 A | 1/1990 | Solomon | |
| 6,634,174 B2 | 10/2003 | Sumser et al. | |
| 6,726,447 B2 | 4/2004 | Lutz | |
| 7,559,199 B2 | 7/2009 | Sausse et al. | |
| 8,113,770 B2* | 2/2012 | Lombard | F02C 6/12 |
| | | | 415/166 |
| 8,210,793 B2* | 7/2012 | Hale | F04D 29/685 |
| | | | 415/206 |
| 10,393,009 B2 | 8/2019 | Mohtar et al. | |
| 10,465,706 B2 | 11/2019 | Lombard et al. | |
| 10,508,743 B2 | 12/2019 | Wakayama et al. | |
| 11,111,843 B2* | 9/2021 | Paterno | F02B 37/22 |
| 11,391,200 B2* | 7/2022 | Karstadt | F04D 29/4213 |
| 2014/0227083 A1 | 8/2014 | Parker et al. | |
| 2014/0308110 A1 | 10/2014 | Houst et al. | |
| 2014/0377051 A1* | 12/2014 | Sun | F04D 29/685 |
| | | | 415/157 |
| 2016/0201693 A1* | 7/2016 | An | F04D 17/10 |
| | | | 415/58.4 |
| 2017/0211707 A1 | 7/2017 | Wakayama et al. | |
| 2017/0292616 A1 | 10/2017 | Moens et al. | |
| 2017/0298943 A1* | 10/2017 | Mohtar | F04D 29/464 |
| 2017/0298953 A1* | 10/2017 | Lombard | F04D 29/464 |
| 2019/0048876 A1* | 2/2019 | Mohtar | F04D 27/0207 |
| 2019/0078586 A1* | 3/2019 | Zeng | F02B 37/24 |
| 2019/0078587 A1* | 3/2019 | Zeng | F04D 27/002 |
| 2020/0208651 A1* | 7/2020 | Bogner | F16K 3/03 |
| 2021/0115942 A1 | 4/2021 | Karstadt | |
| 2021/0262483 A1* | 8/2021 | Henzler | F04D 29/663 |

FOREIGN PATENT DOCUMENTS

| | | |
|---|---|---|
| DE | 1628232 A1 | 8/1971 |
| DE | 60212760 T2 | 6/2007 |
| DE | 102009014350 A1 | 9/2010 |
| DE | 112019000398 T5 | 10/2020 |
| EP | 1433958 A2 | 6/2004 |
| EP | 2083173 A1 | 7/2009 |
| EP | 3236077 A1 | 10/2017 |
| EP | 3613993 A1 | 2/2020 |
| GB | 957884 A | 5/1964 |
| JP | H09310699 A | 12/1997 |
| JP | 2010138765 A | 6/2010 |
| KR | 20150119950 A | 10/2015 |
| WO | 2009133335 A1 | 11/2009 |
| WO | 2016041024 A2 | 3/2016 |
| WO | 2016052372 A1 | 4/2016 |
| WO | 2018045153 A1 | 3/2018 |

OTHER PUBLICATIONS

English language abstract for DE 11 2019 000 398 15 extracted from espacenet.com database on Sep. 12, 2022, 2 pages.

English language abstract for CN 107304709 A extracted from espacenet.com database on Sep. 30, 2021, 2 pages.

English language abstract not found for DE 1 426 076 A; however, see English language equivalent U.S. Pat. No. 3,195,805. Original document extracted from espacenet.com database on Sep. 30, 2021, 11 pages.

English language abstract not found for DE 1 628 232 A1; however, see English language equivalent U.S. Pat. No. 3,362,625. Original document extracted from espacenet.com database on Sep. 30, 2021, 6 pages.

English language abstract and machine-assisted English translation for DE 10 2009 014 350 A1 extracted from espacenet.com database on Sep. 30, 2021, 13 pages.

English language abstract and machine-assisted English translation for EP 1 433 958 A2 extracted from espacenet.com database on Sep. 30, 2021, 7 pages.

English language abstract and machine-assisted English translation for JPH 09-310699 A extracted from espacenet.com database on Sep. 30, 2021, 6 pages.

English language abstract and machine-assisted English translation for JP 2010-138765 A extracted from espacenet.com database on Sep. 30, 2021, 11 pages.

English language abstract and machine-assisted English translation for KR 2015-0119950 A extracted from espacenet.com database on Sep. 30, 2021, 11 pages.

English language abstract for WO 2016/052372 A1 extracted from espacenet.com database on Sep. 30, 2021, 2 pages.

* cited by examiner

TURBOCHARGER INCLUDING A SWITCHABLE TRIM COMPRESSOR AND PORTED SHROUD

CROSS REFERENCE TO RELATED APPLICATIONS

This application claims priority pursuant to 35 U.S.C. 119(a) to U.S. Provisional Patent App. Ser. No. 63/082,378, filed Sep. 23, 2020, which application is incorporated herein by reference in its entirety.

BACKGROUND OF THE INVENTION

1. Field of the Invention

The invention generally relates to a turbocharger including a switchable trim compressor and a ported shroud for use in a vehicle.

2. Description of the Related Art

Turbochargers receive exhaust gas from an internal combustion engine and deliver compressed air to the internal combustion engine. Turbochargers are used to increase power output of the internal combustion engine, lower fuel consumption of the internal combustion engine, and reduce emissions produced by the internal combustion engine. Delivery of compressed air to the internal combustion engine by the turbocharger allows the internal combustion engine to be smaller, yet able to develop the same or similar amount of horsepower as larger, naturally-aspirated internal combustion engines. Having a smaller internal combustion engine for use in a vehicle reduces the mass and aerodynamic frontal area of the vehicle, which helps reduce fuel consumption of the internal combustion engine and improve fuel economy of the vehicle.

Typical turbochargers include a turbine housing defining a turbine housing interior, a turbine wheel disposed within the turbine housing interior, and a shaft coupled to and rotatable by the turbine wheel. Typical turbochargers also include a compressor assembly (sometimes referred to simply as a compressor) including a compressor housing defining a compressor housing interior and a flow path. The flow path fluidly couples the interior of the compressor housing with the internal combustion engine. Typical turbochargers further include a compressor wheel disposed within the interior of the compressor housing and coupled to the shaft. The compressor wheel is rotatable by the shaft for delivering the compressed air to the internal combustion engine through the flow path. Specifically, energy from exhaust gas from the internal combustion engine, which would normally be wasted energy, is used to drive the turbine wheel, which is used to drive the shaft and, in turn, the compressor wheel to the deliver compressed air to the internal combustion engine.

The compressor assembly has a trim which influences the amount of airflow through the compressor wheel. As such, depending on the desired performance of the internal combustion engine, typical compressor wheels are designed to deliver a target airflow to the internal combustion engine. In typical turbochargers, the airflow through the compressor wheel and to the internal combustion engine may also be influenced by other factors.

Typical compressor assemblies in single stage turbochargers have a fixed inlet diameter in the housing and associated inducer diameter in the wheel which as a relative diameter to the wheel's exducer diameter is sometimes referred to as a compressor wheel trim or compressor housing trim. However, more recent compressor assemblies may include a variable compressor inlet area or inlet diameter which is sometimes referred to a variable compressor trim or switchable trim compressor. The switchable trim features is achieved by means of reducing or partially blocking the inlet area leading to the compressor wheel.

A variable trim compressor with a ported shroud provides for an improvement to the characteristics of variable compressor trim for use in a turbocharger.

SUMMARY OF THE INVENTION AND ADVANTAGES

A turbocharger for receiving exhaust gas from an internal combustion engine and for delivering compressed air to the internal combustion engine includes a turbine housing which defines a turbine housing interior. The turbocharger also includes a turbine wheel disposed within the turbine housing interior for receiving the exhaust gas from the internal combustion engine. A turbocharger shaft is coupled to and rotatable by the turbine wheel, and the turbocharger shaft extends along an axis that extends longitudinally through the turbine housing interior. Moreover, the turbocharger includes a compressor assembly including a compressor housing defining an interior, with the compressor housing having an air inlet portion spaced from the turbocharger shaft and disposed about the axis, and the air inlet defines an inlet diameter (ID) perpendicular to the axis.

The turbocharger also includes a compressor wheel disposed within the interior of the compressor housing and coupled to the turbocharger shaft. The compressor wheel is rotatable by the turbocharger shaft and is disposed between the air inlet portion and the turbine wheel for delivering compressed air to the internal combustion engine.

Finally, the turbocharger includes a switchable trim compressor (STC), alternatively referred to as an airflow adjustment assembly, and a ported shroud defined within a portion of the compressor housing and optionally within the inlet adapter housing. The switchable trim compressor and ported shroud function to control the flow of air between the air inlet of the compressor assembly and the outlet to the internal combustion engine and to allow for the recirculation of air back to the air inlet under certain engine operating conditions based upon the positioning of the switchable trim compressor in a first trim position (i.e., a closed trim position) or in a second trim position (i.e., an open trim position). The ported shroud includes a first port contained within the compressor housing that opens to the interior of the compressor housing between the switchable trim compressor and the compressor wheel, and also includes a second port fluidically connected between the first port and the air inlet portion, with the second port disposed partially in said inlet adaptor housing.

In particular, the movement of said switchable trim compressor to the first trim position decreases the inlet diameter to a minimum inlet diameter to decrease the rate of air flow through the air inlet opening at a given shaft rotational rate to a minimum air flow value and blocks the second port to prevent fluid from flowing through the first and second port to a position upstream of the switchable trim compressor near the air inlet opening. Conversely, the movement of said switchable trim compressor to the second trim position increases the inlet diameter to a maximum inlet diameter to increase the rate of air flow through the air inlet opening at the given shaft rotational rate to a maximum air flow value and unblocks the second port to allow fluid to flow through the first and second port to the position upstream of the switchable trim compressor near the air inlet opening. As such, depending on the desired performance of the internal combustion engine, the turbocharger including the switchable trim compressor (STC), and ported shroud as provided herein is designed to deliver a target airflow to the internal combustion engine at a given shaft rotational rate.

The present invention is also directed at a compressor assembly for a turbocharger for a vehicle as described in any of the embodiments above, as well as an associated method for controlling mass fluid flow in a turbocharger of a vehicle with the turbocharger including the switchable trim compressor (STC), and ported shroud as provided herein.

BRIEF DESCRIPTION OF THE DRAWINGS

Other advantages of the present invention will be readily appreciated, as the same becomes better understood by reference to the following detailed description when considered in connection with the accompanying drawings. The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
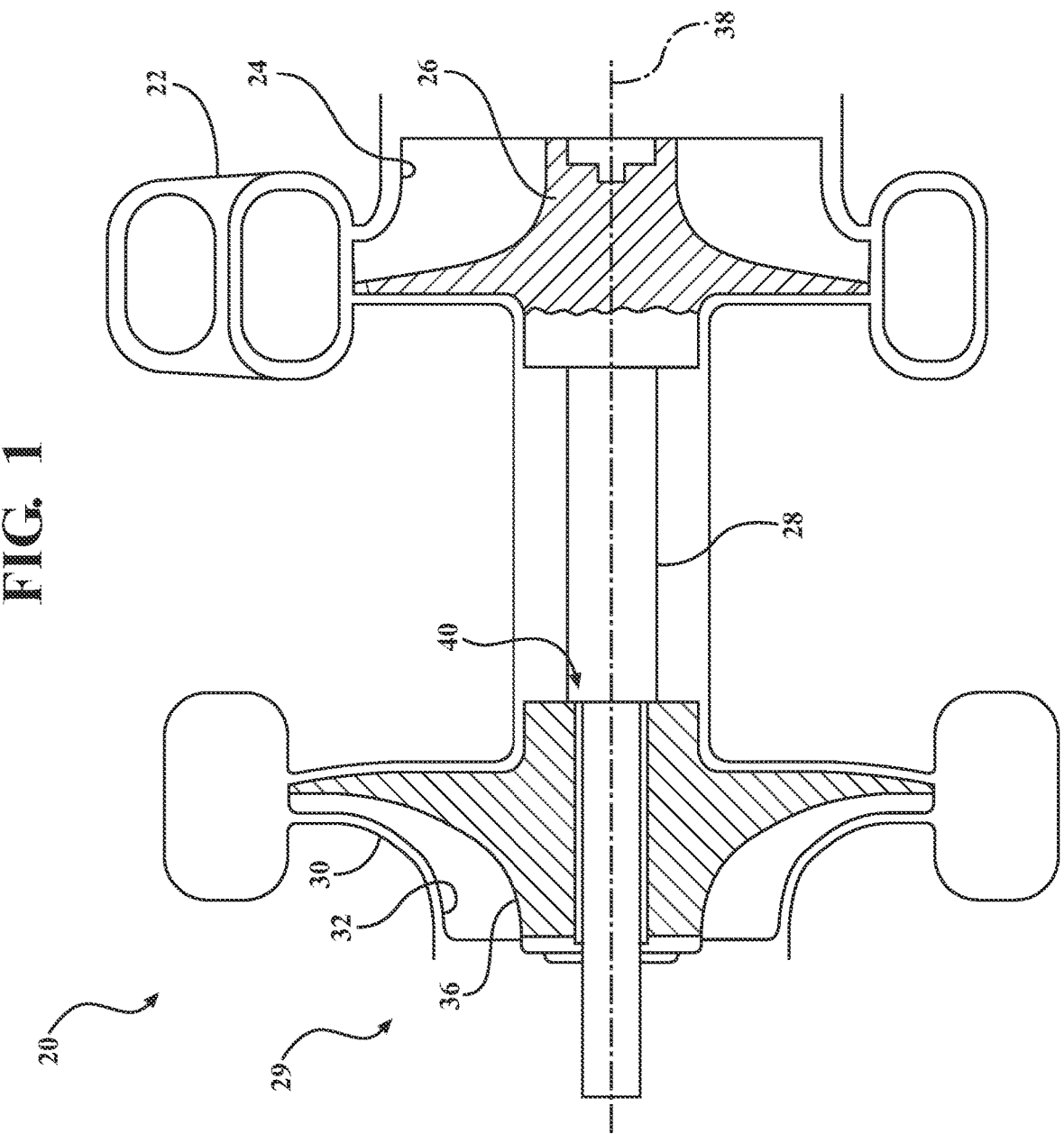
FIG. 1 is a schematic partial cross-section illustration of a turbocharger.

With reference to one exemplary embodiment illustrated in FIGS. 1-7, wherein like numerals indicate like parts throughout the several views, a turbocharger 20 is generally shown in FIG. 1. The turbocharger 20 receives exhaust gas from an internal combustion engine and delivers compressed air to the internal combustion engine. The turbocharger 20 includes a turbine housing 22 defining a turbine housing interior 24. The turbine housing 22 receives and directs exhaust gas from the internal combustion engine. The turbocharger 20 includes a turbine wheel 26 within the turbine housing interior 24 for receiving the exhaust gas from the internal combustion engine. Specifically, the exhaust gas from the internal combustion engine is used to drive the turbine wheel 26. The turbocharger 20 includes a shaft 28 coupled to and rotatable by the turbine wheel 26. Specifically, the turbine wheel 26 is driven by the exhaust gas from the internal combustion engine, which, in turn, rotates the shaft 28. The shaft 28 extends along an axis 38 that extends longitudinally through the turbine housing interior 24.

The turbocharger 20 includes a compressor assembly 29 (sometimes also referred to simply as a compressor 29) including a compressor housing 30 defining an interior 32 of the compressor housing 30 and a flow path 34. The interior 32 of the compressor housing 30 receives and directs air to the internal combustion engine. The flow path 34 fluidly couples the interior 32 of the compressor housing 30 with the internal combustion engine. The compressor housing 30 includes an air inlet portion 35 which is spaced apart from the shaft 28 and is disposed about the axis 38. The air inlet portion 35 defines an inlet diameter (ID) perpendicular to the axis 38 and roughly corresponds to the area between and within the end of the compressor housing 30 and the end of the inlet adaptor housing 41 of the inlet socket (see FIG. 2), which extends between and connects the turbine housing 22 with the compressor housing 30. The turbocharger 20 includes a compressor wheel 36 disposed within the interior 32 of the compressor housing 30 and coupled to the shaft 28. The compressor wheel 36 is disposed between the air inlet portion 35 and the turbine wheel 26. The compressor wheel 36 is rotatable by the shaft 28 for delivering the compressed air to the internal combustion engine through the flow path 34.

The turbocharger 20 also includes a switchable trim compressor 40, sometimes alternatively referred an airflow adjustment assembly 40, which may be disposed at least partially, and in certain embodiments entirely, within the interior 32 of the compressor housing 30. In the three alternative embodiments illustrated herein in FIGS. 2-27, the entire switchable trim compressor 40 is disposed within the interior 32 of the compressor housing 30. Moreover, the flow path 34 is disposed parallel with the axis 38 and flows into the switchable trim compressor 40 at one end, flows through the switchable trim compressor 40 and exits the switchable trim compressor 40 at an opposite end where the air continues to flow into the compressor housing 30 towards the internal combustion engine. The turbocharger 20 also includes a ported shroud 45 (see FIGS. 2-27), or recirculation channel 45, typically contained within a portion of the compressor housing 30 and/or the inlet adaptor housing 41 that works in conjunction with the switchable trim compressor 40 in the alternative embodiments to provide a recirculating air flow feature back to the air inlet portion 35 under certain engine operating conditions, as described below.

Referring first to FIGS. 2-7, one alternative embodiment of a switchable trim compressor 40 and ported shroud 45 is provided, in which the switchable trim compressor 40 is disposed within the interior 32 of the compressor housing 30 and around the shaft 28 at an area adjacent to the inlet adaptor housing 41 and in which the ported shroud 45 is contained within both the compressor housing 30 and inlet adaptor housing 41.

Figure 2:
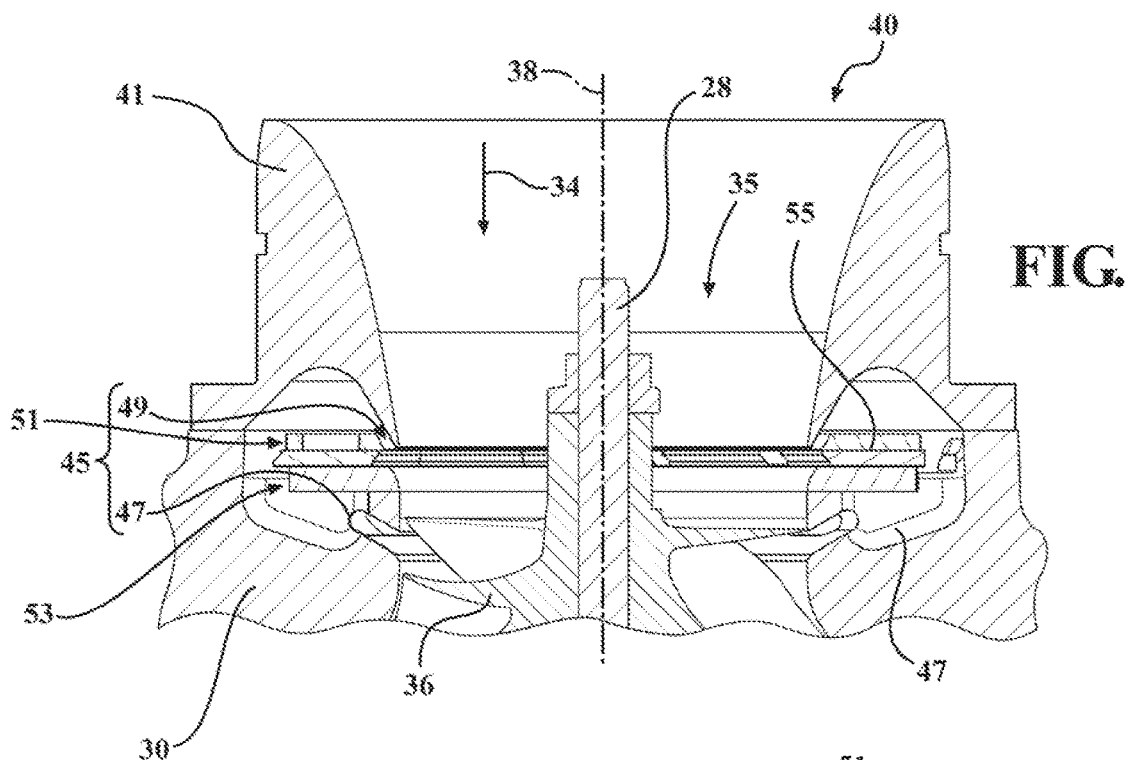
FIG. 2 is a cross-sectional view a portion of the inlet adaptor housing and the compressor assembly including the compressor housing having a ported shroud and switchable trim compressor for use in the turbocharger of FIG. 1 according to one exemplary embodiment.

As best shown in FIG. 2, the ported shroud 45 includes a first port 47, or entry port 47, contained in the compressor housing 30 that opens into the interior 32 of the compressor housing 30 between the switchable trim compressor 40 and the compressor wheel 36. The ported shroud 45 includes a second port 49, or re-entry port 49, disposed partially within the inlet adaptor housing 41 which is fluidically connected to the first port 47.

Figure 3:
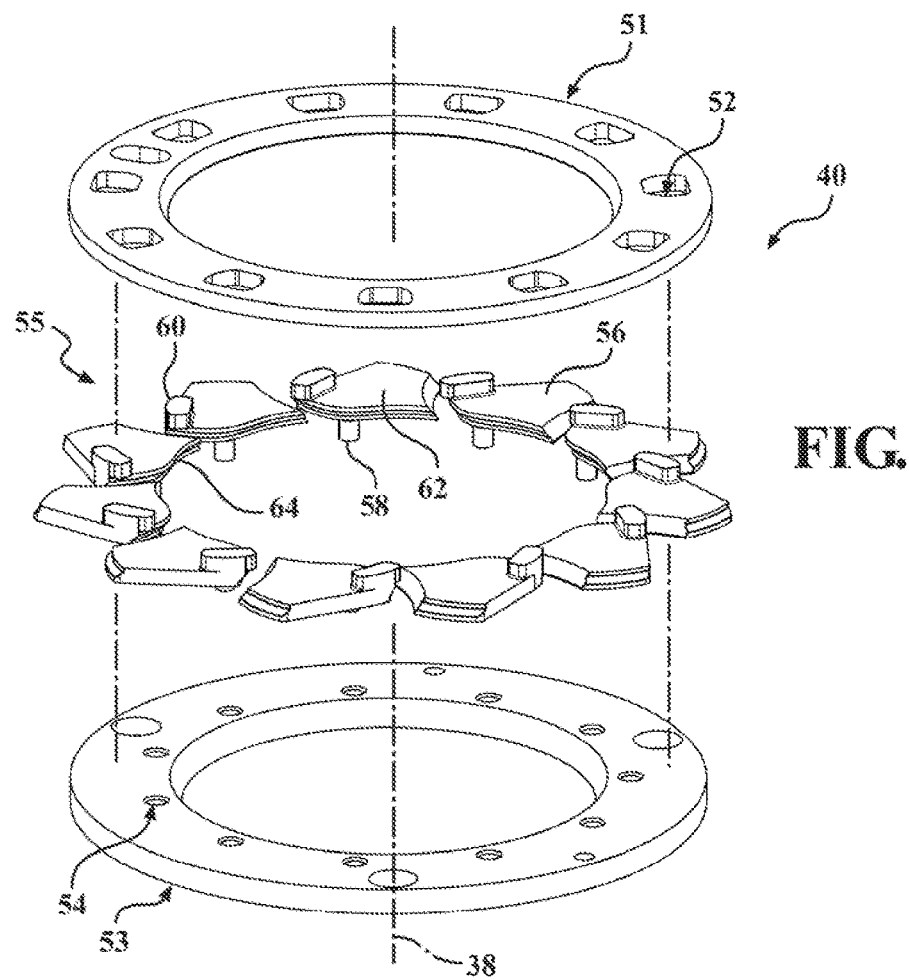
FIG. 3 is an exploded view of the switchable trim compressor of FIG. 2 including the adjustment ring, the switchable trim compressor petal, and the stationary ring.
Figure 5:
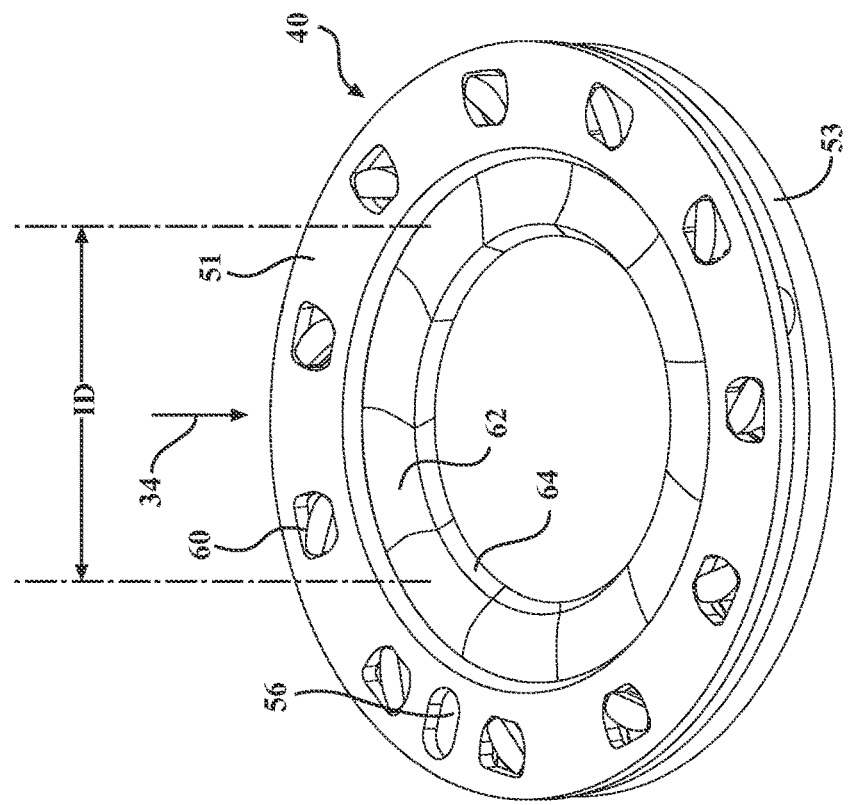
FIG. 5 is an assembled view of the switchable trim compressor of FIG. 3 in an assembled state with the switchable trim compressor petal in the first trim position as in FIG. 4.
Figure 4:
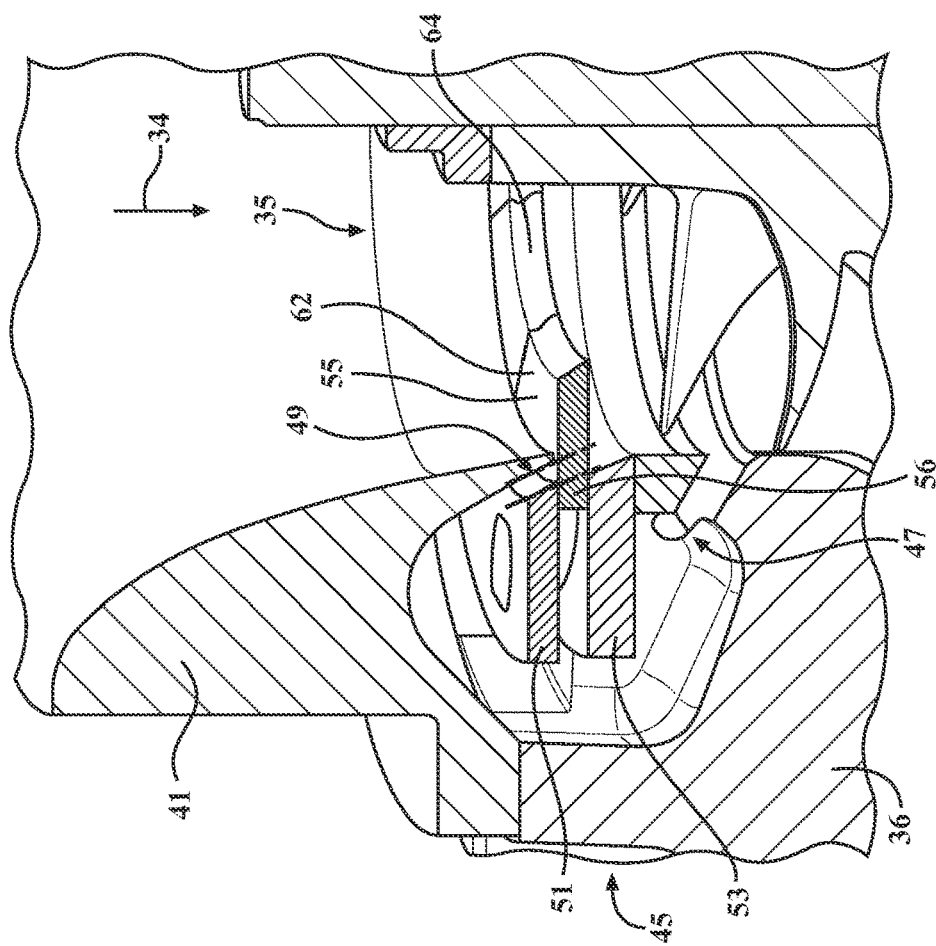
FIG. 4 is perspective view of a portion of the inlet adapter housing and the compressor assembly including the compressor housing and the switchable trim compressor with the switchable trim compressor petal in a first trim position blocking the re-entry port of the ported shroud.
Figure 7:
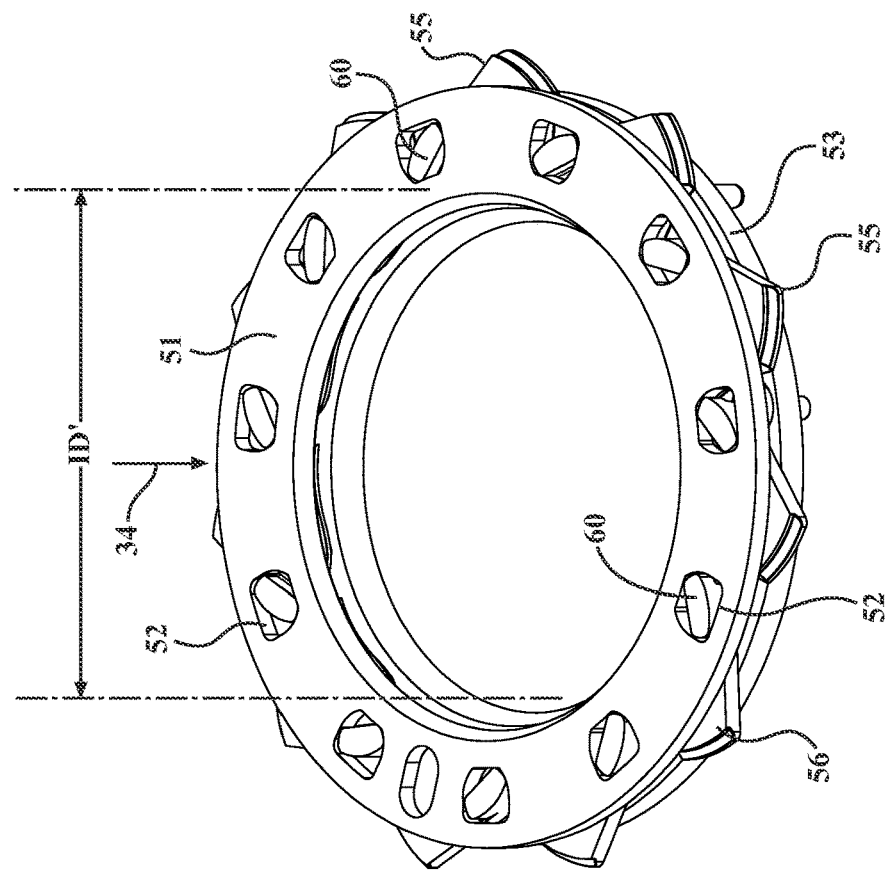
FIG. 7 is an assembled view of the switchable trim compressor of FIG. 3 in an assembled state with the switchable trim compressor petal in the second trim position as in FIG. 6.
Figure 6:
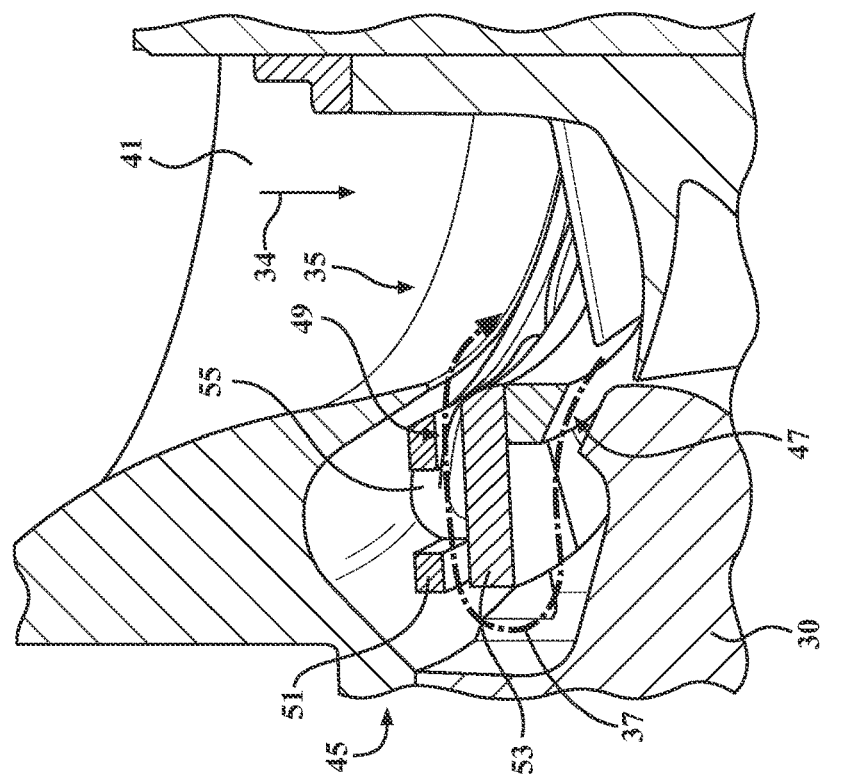
FIG. 6 is perspective view of a portion of the inlet adapter housing and the compressor assembly including the compressor housing and the switchable trim compressor with the switchable trim compressor petal in a second trim position unblocked from the re-entry port of the ported shroud.

As best shown in FIG. 3, the switchable trim compressor 40 includes an adjusting ring 51 (sometimes alternatively referred to as an adjustment ring 51) and a stationary ring 53. The switchable trim compressor 40 also includes a plurality of switchable trim compressor petals 55 disposed between, and coupled to, each of the adjusting ring 51 and stationary ring 53.

Each of the switchable trim compressor petals 55 includes a generally triangular-shaped body portion 56. The body portion 56 includes a rotational peg 58 rotatably disposed within a respective opening 54 defined in the stationary ring 53, and an opposing non-circular flange portion 60 that is disposed within a corresponding flange opening 52 defined in the adjusting ring 51. The body portion 56 also includes a protruding portion 62 having a grooved portion 64.

The adjusting ring 51 is coupled to an actuator (not shown) which causes the adjusting ring 51 to rotate about the axis 38 clockwise or counterclockwise relative to the stationary ring 53 between a first position (see FIGS. 4 and 5), or closed position, and a second position (see FIGS. 6 and 7), or open position to adjust (i.e., decrease or increase) the flow of fluid (i.e. air) 34 through the air inlet opening 35 depending upon the determined engine operating condition corresponding to the rotation of the shaft 28. The rotation of the adjusting ring 51 relative to the stationary ring 53 about the axis 38 causes the flange portion 60 of the switchable trim compressor petals 55 to move in conjunction therewith, while the rotational peg 58 rotates about an axis defined normal to the length of the peg 58 and the opening 54. Further, the movement of the flange portion 60 causes the protruding portion 62 to pivot inward or outward relative to the shaft 28 to decrease or increase the diameter (ID or ID'—see FIGS. 5 and 7) between a minimum and maximum diameter value for the inlet air opening 35, which correspondingly decreases or increases the area for air flow through the air inlet opening 35 and into the interior 32 of the compressor housing 30 at a given shaft 28 rotational rate corresponding to an engine operating condition.

The positioning of the adjusting ring 51 in the first position, and hence the positioning of the switchable trim compressor 40 in the associated first or closed position (see FIGS. 4 and 5—also referred to as the first or closed trim position to differentiate from the first or closed position of the adjusting ring 51), causes the protruding portion 62 of the switchable trim compressor petals 55 to move inward towards the shaft 28 and inward of an interior circumferential surface of each of the adjusting ring 51 and stationary ring 53, thereby decreasing the diameter of the air inlet opening 35 from a first diameter value, or maximum diameter value (ID'—see FIG. 7), to a second diameter value, or minimum diameter value (ID—see FIG. 5) and correspondingly decreasing the area for air flow 34 through the air inlet opening 35 and into the interior 32 of the compressor housing 30 from a first air flow value, or maximum air flow value, to a second air flow value, or minimum air flow value, at the given rotational rate of the shaft 28. At the same time, the body portion 56 of a respective switchable trim compressor petal 55 is blocking the second port 49, or re-entry port 49. This blocking of the re-entry port 49 by the body portion 56 prevents air from recirculating to a position upstream of the switchable trim compressor 40 at a position near the air inlet opening 35 at the given rotational rate of the shaft 28.

Conversely, the positioning of the adjusting ring 51 in the second position or open position, and hence the positioning of the switchable trim compressor 40 in the associated second or open position (see FIGS. 6 and 7—also referred to as the second or open trim position to differentiate from the second or open position of the adjusting ring 51) causes the protruding portion 62 to move outward away from the shaft 28 and outward of the interior circumferential surface of each of the adjusting ring 51 and stationary ring 53, thereby increasing the diameter of the air inlet opening 35 from the minimum diameter value (ID—see FIG. 5) to the maximum diameter value (ID'—see FIG. 7) and correspondingly increasing the area for air flow 34 through the air inlet opening 35 and into the interior 32 of the compressor housing 30 to the maximum air flow value at the given rotational rate of the shaft 28. At the same time, the body portion 56 of a respective switchable trim compressor petal 55 is repositioned and is not blocking the second port 49, or re-entry port 49, which terminates at a position near to the inner circumferential surface of the adjusting ring 51, thereby allowing air to recirculate from the interior 32 of the compressor housing 30 through the first port 47 and second port 49 to a position upstream of the switchable trim compressor 40 at a position near the air inlet opening 35, as shown by arrow 37.

While not illustrated, the positioning of the adjusting ring 51 in an intermediate position between the first position and second position, and hence the positioning of the switchable trim compressor 40 between the second or open position and the first or closed position, causes the protruding portion 62 to move outward away from the shaft 28 and outward of the interior circumferential surface of each of the adjusting ring 51 and stationary ring 53 to a position between the minimum diameter value (ID—see FIG. 5) and the maximum diameter value (ID'—see FIG. 7) and correspondingly adjusting the area for air flow through the air inlet opening 35 and into the interior 32 of the compressor housing 30 to a flow value between the maximum air flow value and the minimum flow value at the given rotational rate of the shaft 28. In addition, the body portion 56 of a respective switchable trim compressor petal 55 are positioned such that they are partially blocking each respective one of the openings of each respective second port 49, or re-entry port 49, thereby allowing an intermediate air flow through the first and second ports 47, 49 to a position upstream of the switchable trim compressor 40 at a position near the air inlet opening 35.

Referring next to FIGS. 8-14, another alternative embodiment of the design of the switchable trim compressor 40 and ported shroud 45 are provided.

Figure 8:
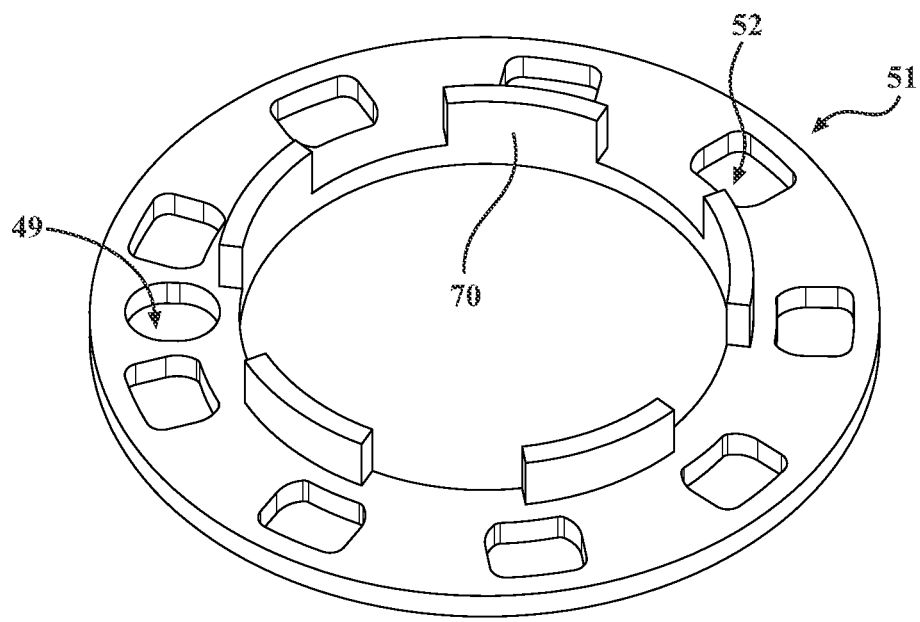
FIG. 8 is a perspective view of an adjustment ring of a switchable trim compressor according to another embodiment for use in the turbocharger of FIG. 1.

In particular, as best shown in FIG. 8, the adjusting ring 51 includes a plurality of spaced apart axial extensions 70 that extend in a direction away from the stationary ring 53 when the switchable trim compressor 40 is in the assembled state and contained within the interior 32 of the compressor housing 30. The stationary ring 53 and switchable trim compressor petals 55, as shown in FIGS. 10-14, are the same as described above in the embodiment of FIGS. 2-7 and are coupled together with the modified adjusting ring 51 in the same manner as described above with respect to the embodiments of FIGS. 2-7.

Figure 9:
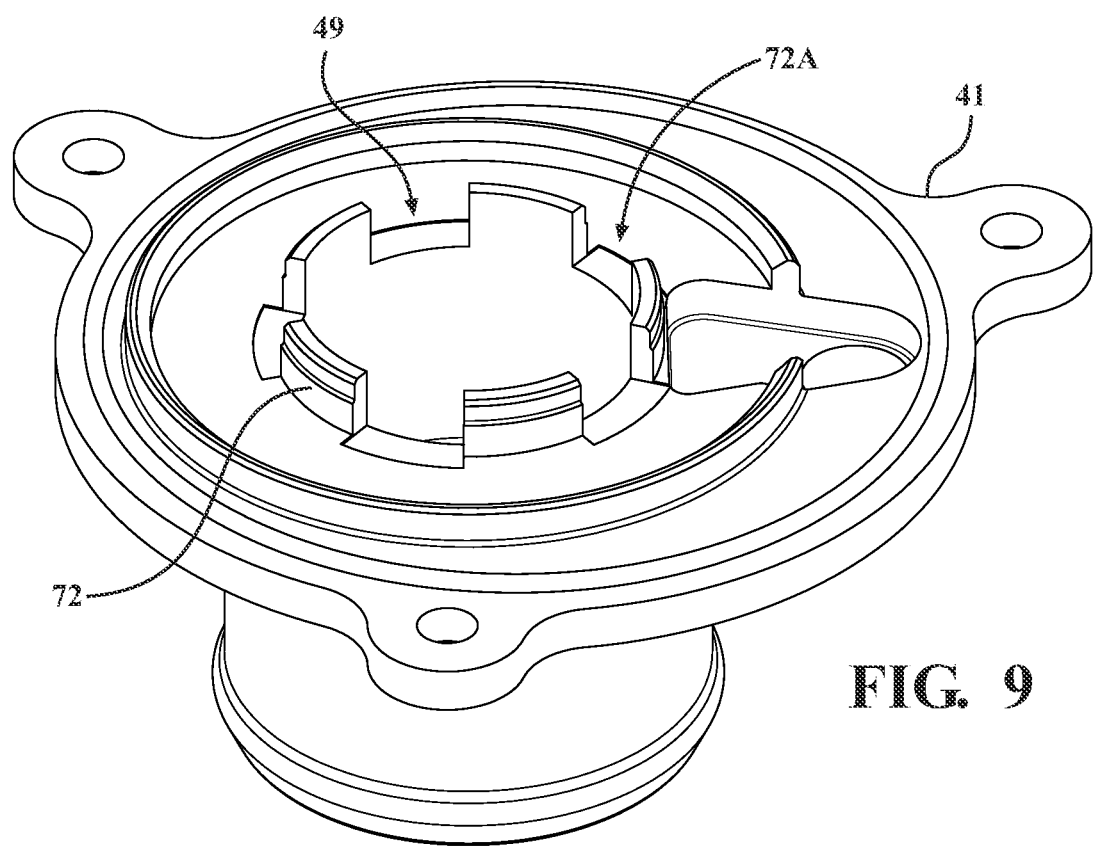
FIG. 9 is a perspective view of a portion of the compressor assembly including an intake socket with recirculation port openings.
Figure 10:
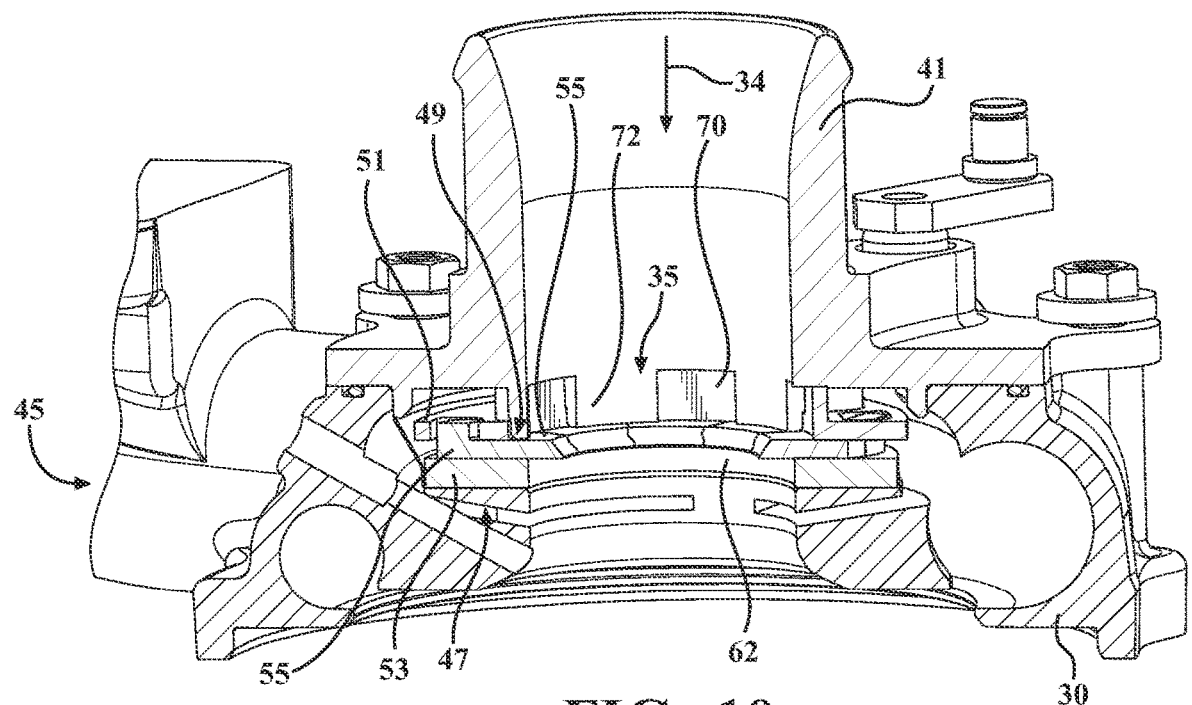
FIG. 10 is perspective view of a portion of the inlet adapter housing of the inlet socket and the switchable trim compressor with the adjustment ring of FIG. 8 and the switchable trim compressor petal in a first trim position blocking the recirculation port openings in the intake socket of FIG. 9.
Figure 11:
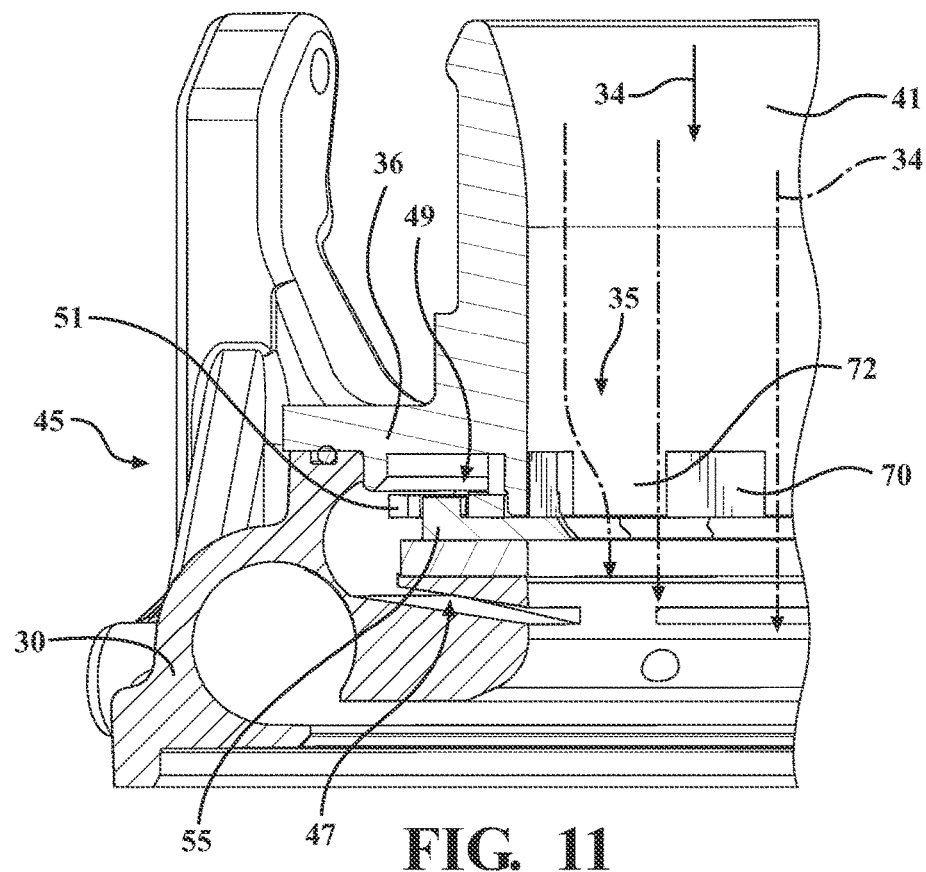
FIG. 11 is perspective view of a portion of the inlet adapter housing and the compressor assembly including the compressor housing and the switchable trim compressor with the adjustment ring of FIG. 8 and the switchable trim compressor petal in the first trim position as in FIG. 10.
Figure 12:
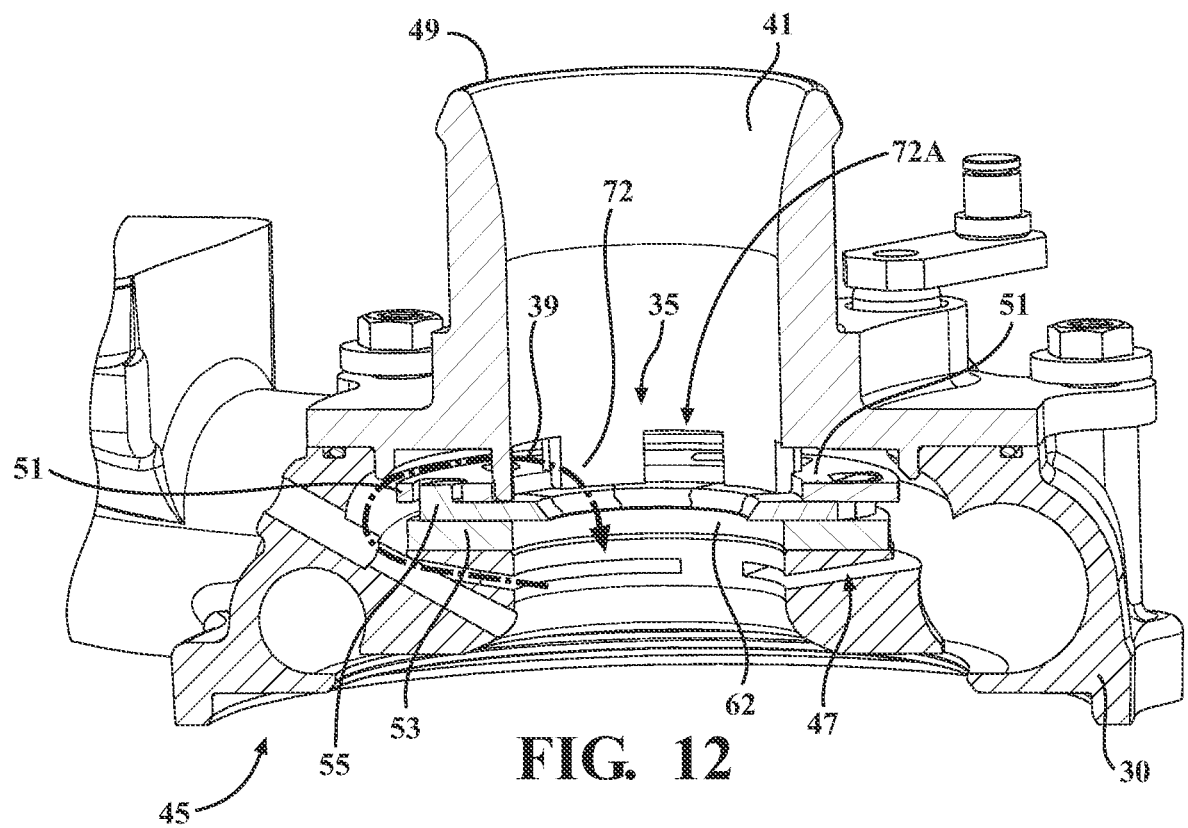
FIG. 12 is perspective view of a portion of the inlet adapter housing and the compressor assembly including the compressor housing and the switchable trim compressor with the adjustment ring of FIG. 8 and the switchable trim compressor petal in a second trim position unblocked from the recirculation port openings in the intake socket of FIG. 9.

Further, as best shown in FIG. 9, the inlet adaptor housing 41 (i.e., the housing of the inlet socket) includes a corresponding plurality of spaced apart axial inlet adaptor extensions 72 with openings 72A defined therebetween. Each of the spaced apart openings 72A of the plurality of spaced apart axial inlet adaptor extensions 72 define a corresponding one of the second ports 49, or re-entry ports 49, of the ported shroud 45. The second port 49 openings are sized and shaped to correspond in size and shape to the spaced apart axial extensions 70 on the adjusting ring 51, and thus the relative positioning of the spaced apart axial extensions 70 relative to the openings of the re-entry ports 49 (i.e., the spaced apart openings 72A of the plurality of spaced apart axial inlet adaptor extensions 72) determines whether air may recirculate from the interior 32 of the compressor housing 30, through the entry port 47 and re-entry ports 49, and to a position upstream of the switchable trim compressor 40 at a position near the air inlet opening 35.

The positioning of the adjusting ring 51 in the first position, and hence the positioning of the switchable trim compressor 40 in the first or closed position (see FIGS. 10 and 11), causes the protruding portion 62 of the switchable trim compressor petals 55 to move inward towards the shaft 28 and inward of the interior circumferential surface of each of the adjusting ring 51 and stationary ring 53, thereby decreasing the diameter of the air inlet opening 35 to the minimum diameter value ID and correspondingly decreasing the area for air flow through the air inlet opening 35 and into the interior 32 of the compressor housing 30 in the same manner as described in the first embodiment above in FIGS. 2-7. Further, in this embodiment, the spaced apart axial extensions 70 are positioned such that they are blocking each respective one of the openings of each respective second port 49, or re-entry port 49 (i.e., are blocking the spaced apart openings 72A of the plurality of spaced apart axial inlet adaptor extensions 72). This blocking of the re-entry port 49 prevents air from recirculating to a position upstream of the switchable trim compressor 40 at a position near the air inlet opening 35.

Conversely, the positioning of the adjusting ring 51 in the second position or open position, and hence the positioning of the switchable trim compressor 40 in the second or open position (see FIGS. 12-14) causes the protruding portion 62 to move outward away from the shaft 28 and outward of the interior circumferential surface of each of the adjusting ring 51 and stationary ring 53, thereby increasing the diameter of the air inlet opening 35 to the maximum diameter ID' and correspondingly increasing the area for air flow through the air inlet opening 35 and into the interior 32 of the compressor housing 30 to the maximum air flow value as described in the first embodiment above in FIGS. 2-7. At the same time, the spaced apart axial extensions 70 are positioned such that they are not blocking each respective one of the openings of each respective second port 49, or re-entry port 49 (i.e., the openings between the spaced apart extension 70 are aligned with the corresponding openings of each respective second port 49 (i.e., are aligned with the spaced apart openings 72A of the plurality of spaced apart axial inlet adaptor extensions 72)), thereby allowing air to recirculate from the interior 32 of the compressor housing 30 through the first port 47 and second port 49 to a position upstream of the switchable trim compressor 40 at a position near the air inlet opening 35, as shown by arrow 39. In certain embodiments, in some operating points, the flow shown by arrow 39 could also flow in the opposite direction.

While not illustrated, and similar to the first embodiment described in FIGS. 2-7, the positioning of the adjusting ring 51 in an intermediate position between the first position and second position, and hence the positioning of the switchable trim compressor 40 between the second or open position and the first or closed position, causes the protruding portion 62 to move outward away from the shaft 28 and outward of the interior circumferential surface of each of the adjusting ring 51 and stationary ring 53 to a position between the minimum diameter value (ID—see FIGS. 10 and 11) and the maximum diameter value (ID'—see FIGS. 12-14) and correspondingly adjusting the area for air flow through the air inlet opening 35 and into the interior 32 of the compressor housing 30 to a flow value between the maximum air flow value and the minimum flow value at the given rotational rate of the shaft 28. Further, the spaced apart axial extensions 70 are positioned such that they are partially blocking each respective one of the openings of each respective second port 49, or re-entry port 49, thereby allowing an intermediate air flow through the first and second ports 47, 49 to a position upstream of the switchable trim compressor 40 at a position near the air inlet opening 35. The term "axial", as in the axial extensions 70 as defined herein, allows for some slight variations from from 90 degrees, such as varying by less than 5 degrees (i.e., between 85 and 95 degrees), or less than 10 degrees (i.e., between 80 and 100 degrees, and still be considered axial as defined herein.

Figure 13:
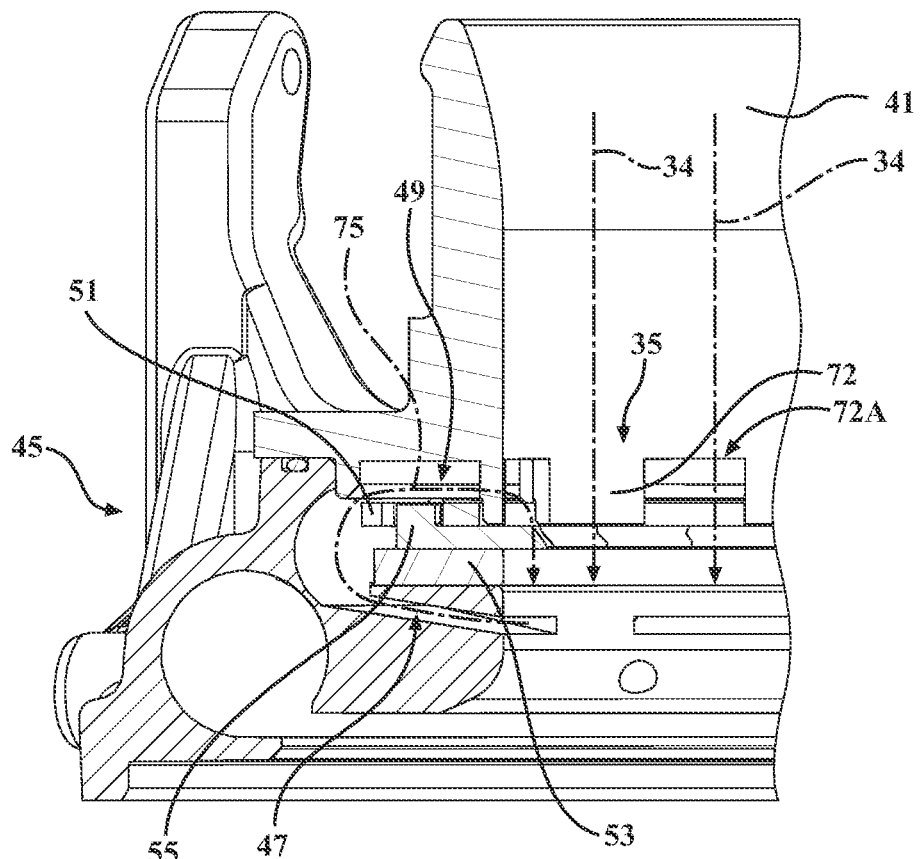
FIG. 13 is a close up view of a portion of FIG. 12 illustrating air flow corresponding to the lower volume flow or surge region of a compressor map.
Figure 14:
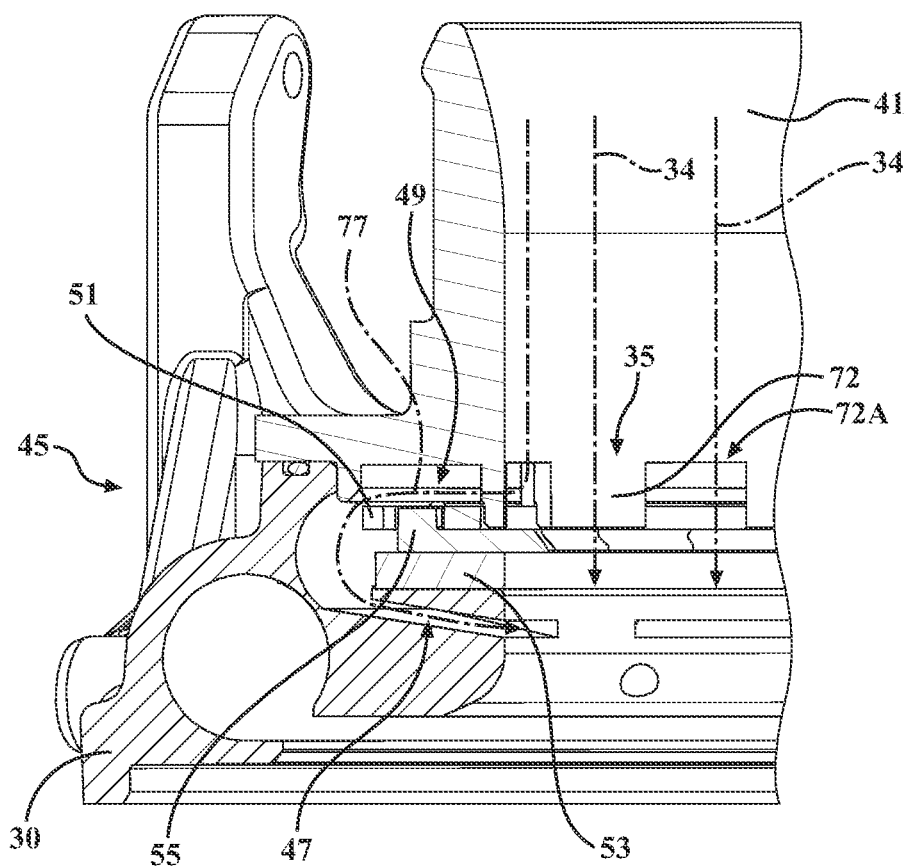
FIG. 14 is a close up view of a portion of FIG. 12 illustrating air flow corresponding operation near the choke flow region of a compressor map.
Figure 15:
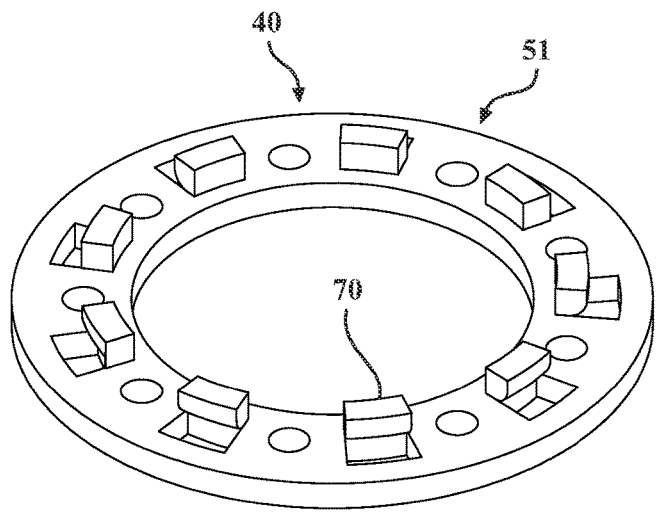
FIGS. 15-18 illustrate perspective views of a moving ring, a guide vane mount insert, a guide vane, and a lever arm of the switchable trim compressor according to yet another embodiment for use in the turbocharger of FIG. 1.

FIGS. 13 and 14 illustrate two separate aspects of the design of the embodiment of FIGS. 8-14 with the switchable trim compressor 40 in second or open position. In particular, FIG. 13 illustrates the potential operation, but not limited to, of the turbocharger 20 near surge region of a compressor map, in which the flow of air recirculated through the ported shroud 45, shown by arrow 75, joins the air flow along air flow path 34 going through the air inlet opening 35 and back into the interior 32 of the compressor housing 30 towards the compressor wheel 36. FIG. 14 illustrates the potential operation, but not limited to, of the turbocharger 20 near the choke flow region of a compressor map, in which the flow of a portion of the air flow 34, shown by arrow 77, bypasses the air inlet opening 35 and instead flows into the second port 49 and then through the first port 47 and into the interior 32 of the compressor housing 30 towards the compressor wheel 36.

Referring next to FIGS. 15-27, yet another alternative embodiment of the design of the switchable trim compressor 40 and ported shroud 45 is provided in which the switchable trim compressor 40 and ported shroud 45 are both contained within the compressor housing 30 (See FIGS. 20-27), which is opened during the assembly process. In this alternative embodiment, and similar to the embodiment of FIGS. 8-14 as shown in FIG. 19, the inlet adaptor housing 41 includes a corresponding plurality of spaced apart axial inlet adaptor extensions 72 with openings 72A defined therebetween, with each of the spaced apart openings 72A between the extensions 72 define a corresponding one of the second ports 49, or re-entry ports 49, of the ported shroud 45.

The switchable trim compressor 40 includes the adjusting ring 51 that includes the plurality of spaced apart axial extensions 70 (see FIG. 15) similar to the adjusting ring 51 illustrated in FIG. 8 above. The switchable trim compressor 40 also includes a guide vane mounted insert 80 (see FIG. 16), one or more guide vanes 90 (see FIG. 17), and one or more vane levers 100 (see FIG. 18).

Figure 16:
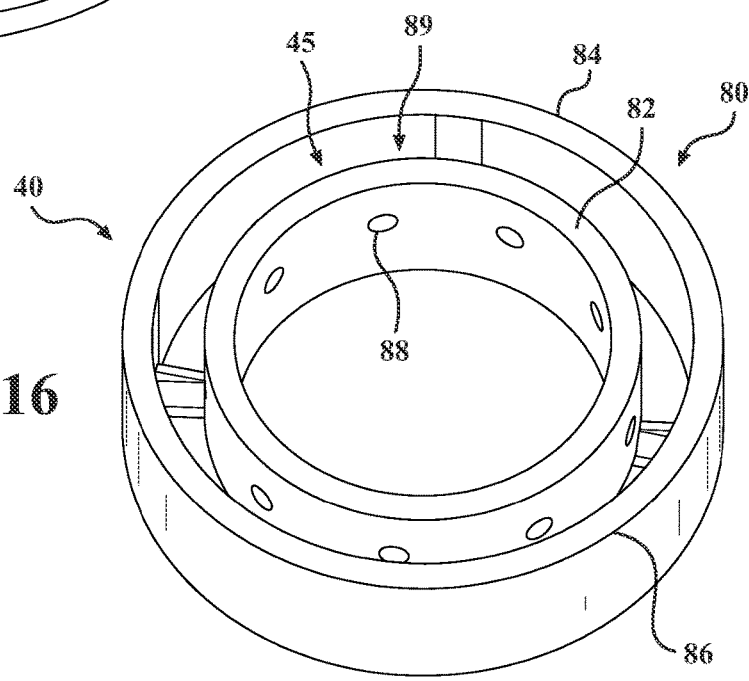

Referring to FIG. 16, the guide vane mounted insert 80 includes an inner ring 82 and an outer ring 84 coupled together with one or more spokes 86, with the outer ring 84 positioned radially outward relative to the inner ring 82. The inner ring 82 defines a plurality of spaced apart openings 88. A channel 89 created between the inner and outer ring 82, 84 defines a portion of the ported shroud 45 between the first and second ports 47, 49.

Figure 17:
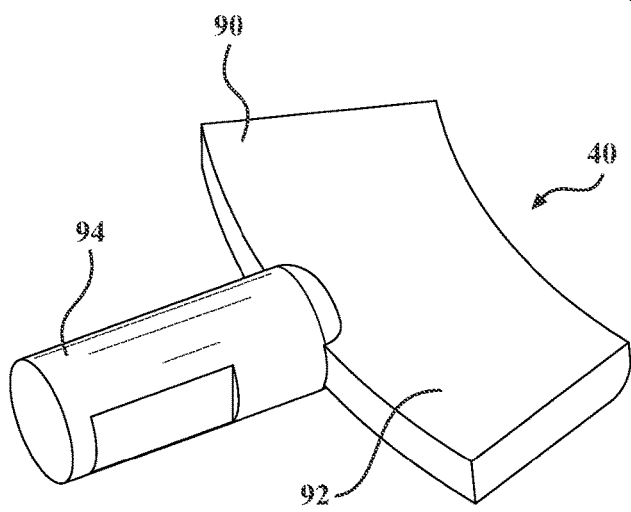

Referring to FIG. 17, each one of the one or more guide vanes 90 (shown in FIGS. 22 and 27 as a plurality of guide vanes 90) each include a body portion 92 and a projection pin 94 extending from the body portion 92, with the projection pin 94 being inserted within a respective one of the spaced apart openings 88 in the inner ring 82 and the body portion 92 extending inwardly within the inner ring 82.

Figure 18:
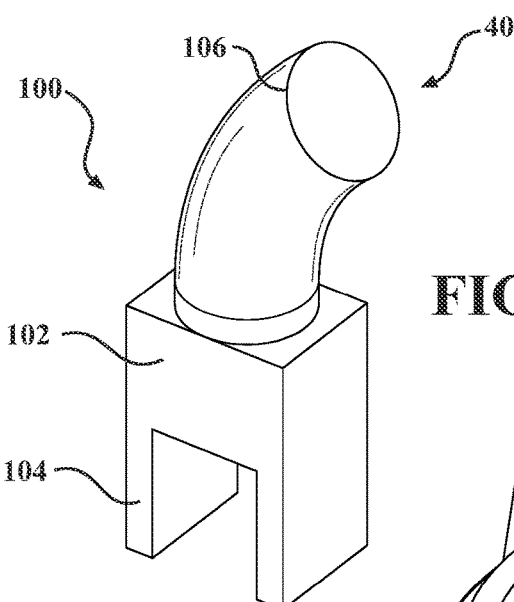
Figure 19:
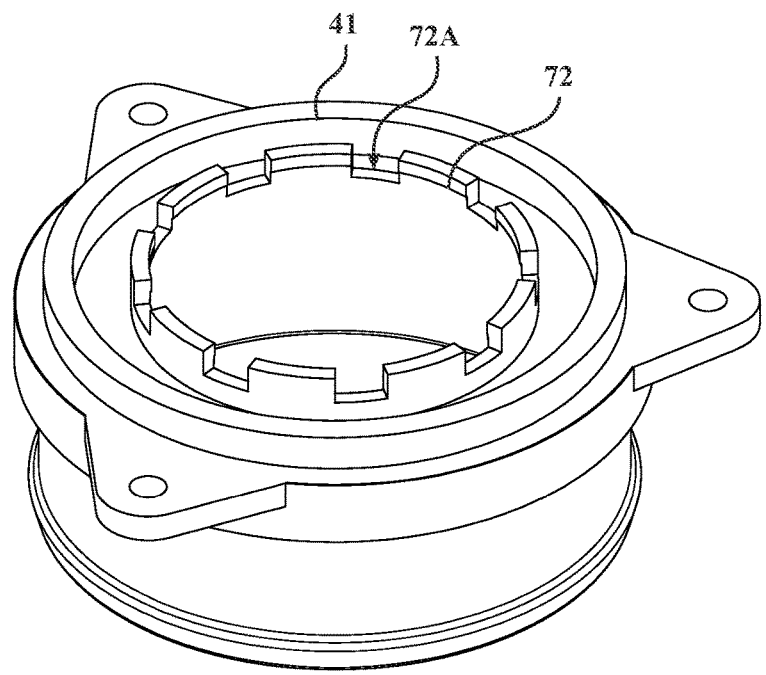
FIG. 19 is a perspective view of a portion of the inlet adapter housing of an intake socket with recirculation port openings.
Figure 20:
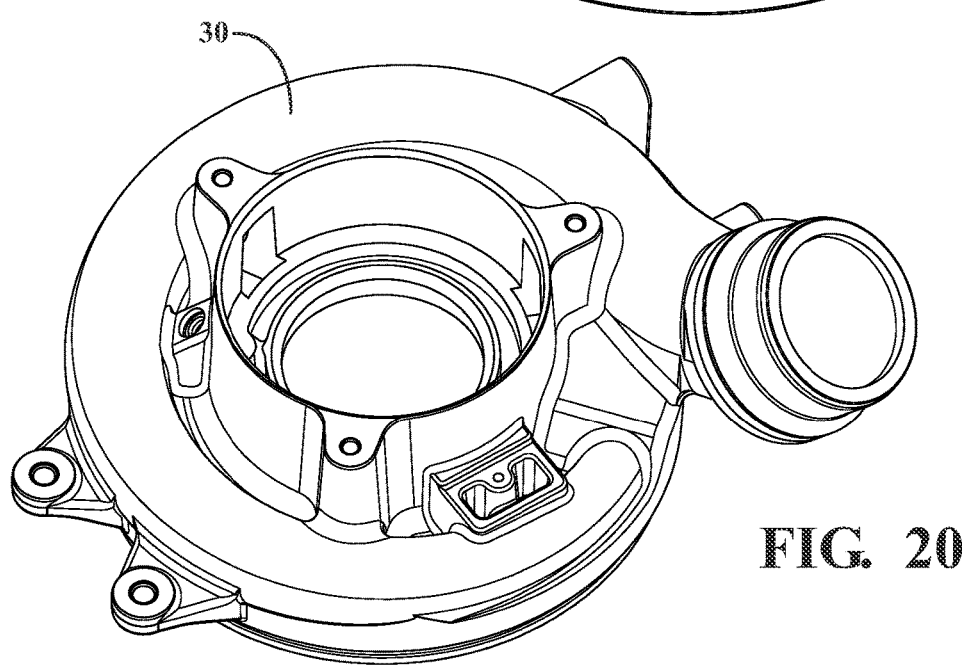
FIG. 20 is a perspective view of a portion of the compressor housing for enclosing the components of FIGS. 15-19.
Figure 21:
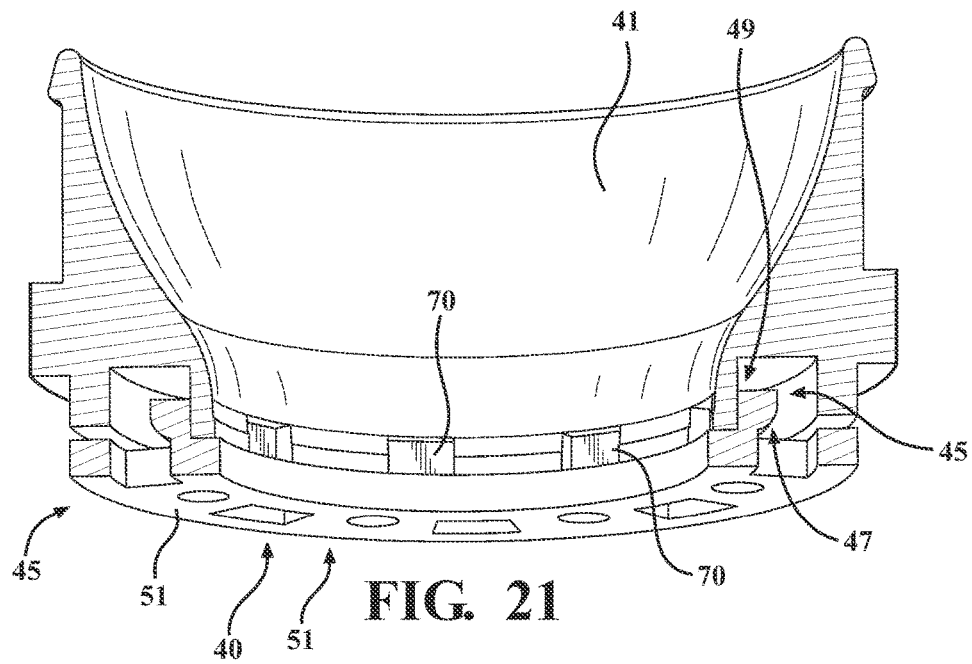
FIG. 21 is a perspective view of a portion of the inlet adaptor housing of the inlet socket and the switchable trim compressor with the components of FIGS. 15-18 and the guide vanes of the switchable trim compressor in a first position, associated with a first trim position, blocking the recirculation port openings in the inlet adaptor housing of the inlet socket of FIG. 19.

Referring to FIG. 18, each of the vane levers 100 (shown in FIGS. 22 and 27 as a plurality of vane levers 100) includes a body portion 102 having a pair of spaced apart pronged portions 104 extending in a first direction and an opposing lever arm 106 that extends within a respective flange opening 52 in the adjusting ring 51, with the spaced apart pronged portions 104 seated against a surface of the adjusting ring 51 in a direction towards the compressor wheel 36 in the assembled state. The lever arms 106 are arced, with the diameter of arcing corresponding to the targeted one or more guide vane 90 openings (see FIGS. 24 and 25).

Figure 22:
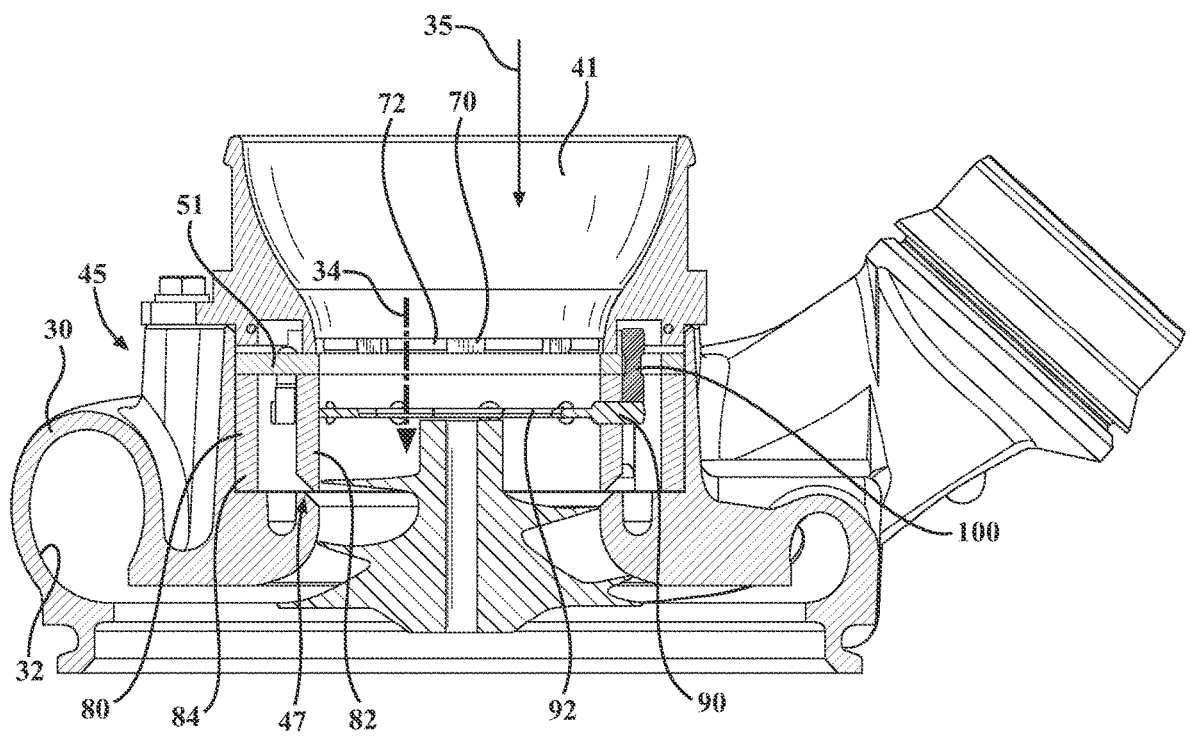
FIG. 22 is another perspective view of a portion of the inlet adaptor housing of the inlet socket and the compressor housing and the switchable trim compressor with the components of FIGS. 15-18 and the guide vanes of the switchable trim compressor in the first position, associated with the first trim position, blocking the recirculation port openings in the inlet adaptor housing of the inlet socket of FIG. 19.
Figure 23:
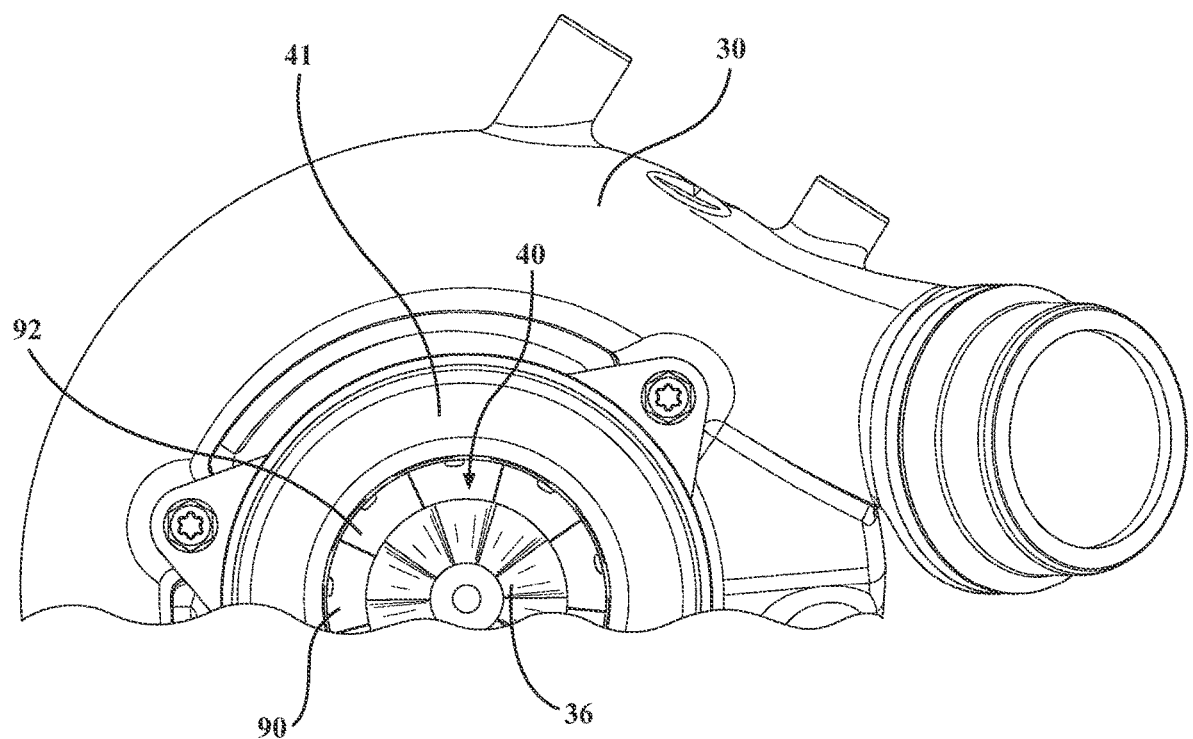
FIG. 23 is a close up rotated view of a portion of FIG. 22 illustrating the compressor housing and the inlet adapter housing and the switchable trim compressor in the first trim position.
Figure 24:
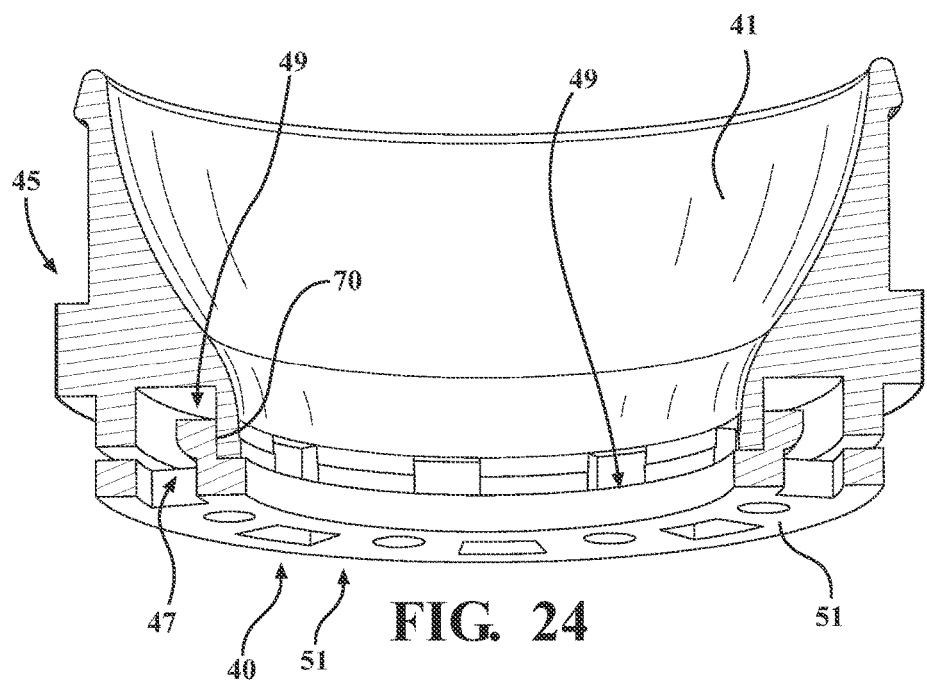
FIG. 24 is a perspective view of a portion of inlet adapter housing and the compressor assembly including the compressor housing and the switchable trim compressor with the components of FIGS. 15-18 and the guide vanes of the switchable trim compressor in a second position, associated with a second trim position, unblocked from the recirculation port openings in the inlet adaptor housing of the inlet socket of FIG. 19.
Figure 25:
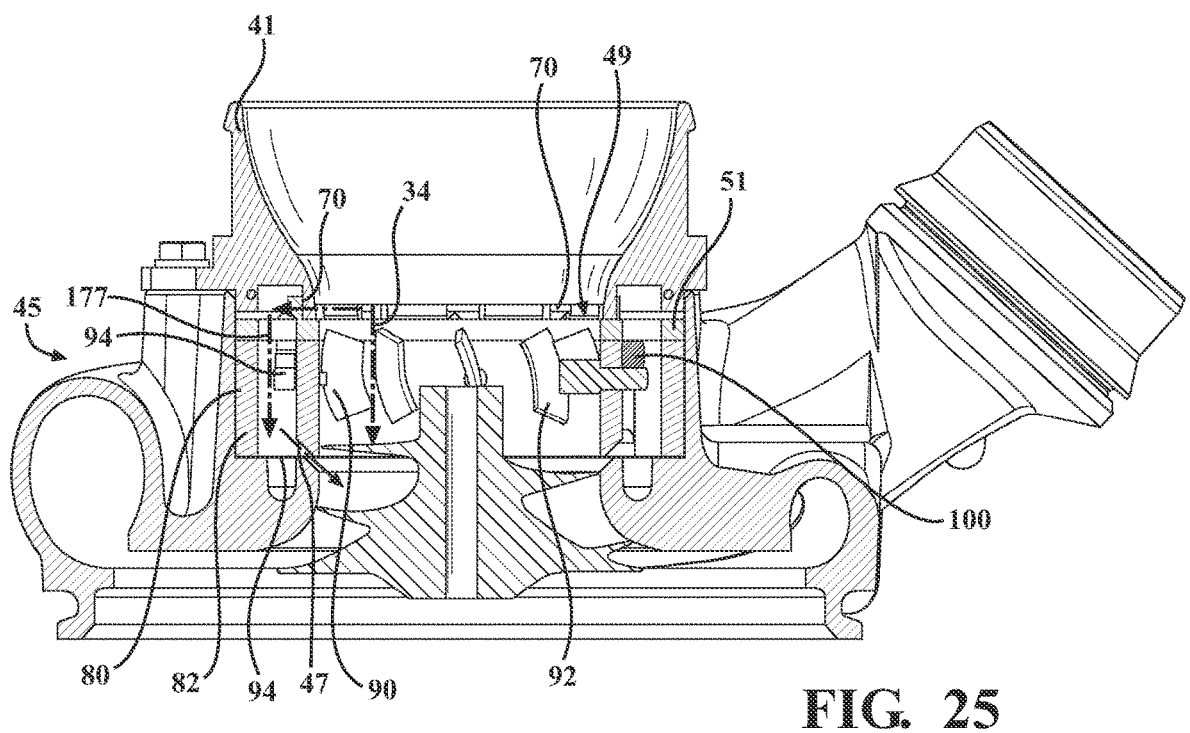
FIG. 25 is another perspective view of a portion of the inlet adapter housing and a compressor assembly including the compressor housing and the switchable trim compressor with the components of FIGS. 15-18 and the guide vanes of the switchable trim compressor in the second position, associated with the second trim position, unblocked from the recirculation port openings in the inlet adaptor housing of the inlet socket of FIG. 19.
Figure 26:
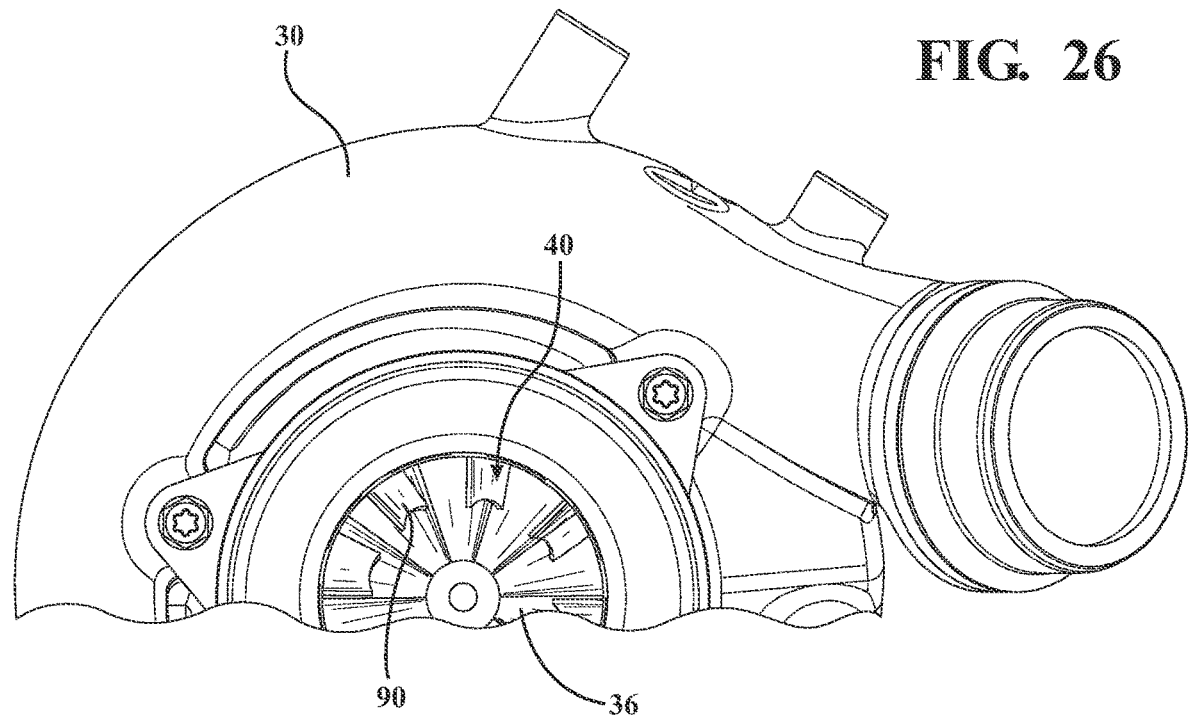
FIG. 26 is a close up rotated top view of a portion of FIG. 25 illustrating the guide vanes of the switchable trim compressor in the second trim position.
Figure 27:
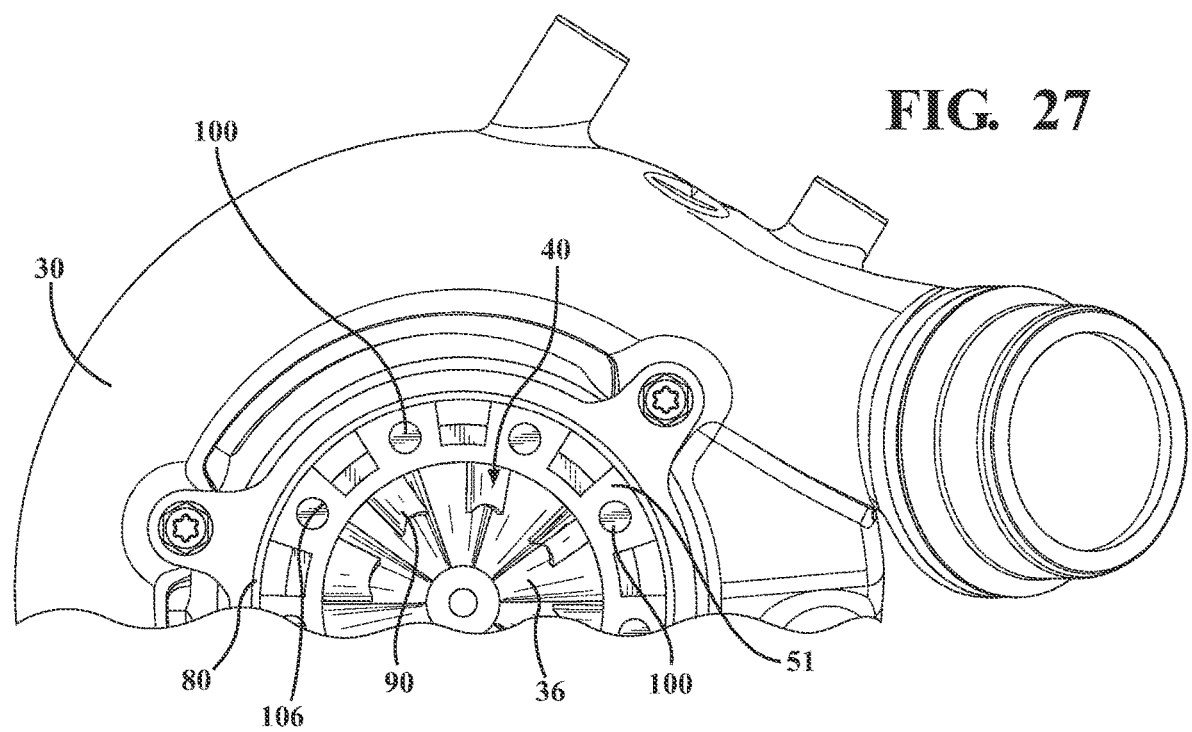
FIG. 27 is another close up rotated top view of a portion of FIG. 25 illustrating the guide vanes of the switchable trim compressor in the second position, associated with the second trim position, and with a portion of the inlet adaptor housing of the inlet socket removed.

The positioning of the adjusting ring 51 in the first position or closed position, and hence the positioning of the switchable trim compressor 40 in the first or closed trim position (see FIGS. 21-23), corresponds to a position in which the body portion 92 of each of the one or more guide vanes 90 are rotated about a projection pin 94 axis to a position such that a major planar surface of the body portion 92 of each one or more guide vanes 90 is normal to the axis 38 (as best shown in FIG. 22), thereby decreasing the area for air flow 34 through the air inlet opening 35 and into the interior 32 of the compressor housing 30. In particular, the rotation of the adjusting ring 51 causes the one or more lever arms 106 to rotate in the direction in which the adjusting ring 51 was rotated. This in turn causes the one or more guide vanes 90 to pivot about an axis defined by the projection pin 94 (i.e., the projection pin axis) of the guide vanes 90 in response, which pivots the body portion 92 of each of the one or more guide vanes 90 to a closed position such that the major planar surface of the body portion 92 of each of the one or more body portions is normal to the axis 38. This restricts air flow 34 through the air inlet portion 35 associated with the body portion 92 of the respective one or more guide vanes 90, and hence decreases the diameter of the air inlet opening 35 from the maximum diameter ID' to the minimum diameter ID similar to the inward movement of the protruding portion 62 of the trim compressor petals 55 in the alternative embodiments of FIGS. 2-14 as shown in FIGS. 4, 5, 10 and 11. Further, in this embodiment, the spaced apart axial extensions 70 are positioned such that they are blocking each respective one of the openings of each respective second port 49, or re-entry port 49, in the inlet adapter housing 41 (i.e., the spaced apart axial extensions 70 are blocking the spaced apart openings 72A of the plurality of spaced apart axial inlet adaptor extensions 72). This blocking of the re-entry port 49 prevents air from recirculating to a position upstream of the switchable trim compressor 40 at a position near the air inlet opening 35.

Conversely, the positioning of the adjusting ring 51 in the second position or open position, and hence the positioning of the switchable trim compressor 40 in the second or open trim position (see FIGS. 24-27) causes the one or more lever arms 106 to rotate in the direction in which the adjusting ring 51 was rotated (typically the opposite rotational direction of the rotation towards the first or closed position). This in turn causes the one or more guide vanes 90 to pivot about the projection pin 94 axis in response, which pivots the body portion 92 of the one or more guide vanes 90 to an open position such that the major planar surface of the body portion 92 of each of the one or more guide vanes 90 is no longer normal to the axis 38, thereby allowing more area for air flow 34 through the air inlet opening 35 and into the interior 32 of the compressor housing 30 along the major planar surface of each of the one or more opened body portions 92 (such as between each adjacent pair of the guide vanes 90 when there are a plurality of guide vanes 90 as in FIGS. 22 and 27). The opened one or more guide vanes 90 thus increases the diameter of the diameter of the air inlet opening 35 to the maximum diameter ID' similar to the outward movement of the protruding portion 62 of the trim compressor petals 55 in the alternative embodiments of FIGS. 2-14 as shown in FIGS. 6, 7, and 12-14. Further, the opened body portion 92 of each of the one or more guide vanes 90 align the flow of air 34 with the compressor wheel 36 when the guide vanes 90 are opened. At the same time, the spaced apart axial extensions 70 of the adjusting ring 51 are positioned such that they are not blocking each respective one of the openings of each respective second port 49, or re-entry port 49 (i.e., the openings between the spaced apart extension 70 are aligned with the corresponding openings of each respective second port 49 (and further are aligned with the spaced apart openings 72A of the plurality of spaced apart axial inlet adaptor extensions 72), thereby allowing air 177 to recirculate from the interior 32 of the compressor housing 30 through the first port 47 and the channel 89 between the inner and outer rings 82, 84 and through the second port 49 of the ported shroud 45 to a position upstream of the switchable trim compressor 40 at a position near the air inlet opening 35.

While not illustrated, the positioning of the adjusting ring 51 in an intermediate position between the first position and second position, and hence the positioning of the switchable trim compressor 40 between the second or open trim position and the first or closed trim position, causes the one or more lever arms 106 to rotate in the direction in which the adjusting ring 51 was rotated. This in turn causes the one or more guide vanes 90 to pivot about the projection pin 94 axis in response, which pivots the body portion 92 of the one or more guide vanes 90 to a partially open position such that the major planar surface of the body portion 92 of each of the one or more guide vanes 90 is no longer normal to the axis 38, but is angled relative to the axis 38, thereby allowing more area for air flow 34 through the air inlet opening 35 and into the interior 32 of the compressor housing 30 along the major planar surface of each of the one or more opened body portions 92 (such as between each adjacent pair of the guide vanes 90 when there are a plurality of guide vanes 90 as in FIGS. 22 and 27) as compared with the first trim position but less air flow 34 as compared with the second trim position. At the same time, the spaced apart axial extensions 70 of the adjusting ring 51 are positioned such that they are only partially blocking each respective one of the openings of each respective second port 49, or re-entry port 49, thereby allowing smaller amount of the air 177 to recirculate from the interior 32 of the compressor housing 30 through the first port 47 and the channel 89 between the inner and outer rings 82, 84 and through the second port 49 of the ported shroud 45 to a position upstream of the switchable trim compressor 40 at a position near the air inlet opening 35.

While each of the separate embodiments of FIGS. 2-27 are described above primarily with respect to the turbochargers 20 including the ported shroud 45 and switchable trim compressor 40 in the various configurations described above, the present invention also relates to the method of operating such turbochargers to control the mass flow of air into the compressor 30 having a ported shroud 45 and switchable trim compressor 40. In each of the embodiments, the switchable trim compressor 40 includes the first trim position, or closed trim position, as described above in which the inner diameter of the air inlet portion 35 is minimized while the switchable trim compressor 40 also functions to block flow through the ported shroud 45. Conversely, in the second trim position, or open trim position, as described above where the inner diameter of the air inlet portion 35 is increased relative to the minimized inner diameter in the closed trim position while the switchable trim compressor 40 also functions to allow recirculation air flow through the ported shroud 45 from the interior 32 of the compressor housing 30 of the compressor assembly 29 to a position upstream of the switchable trim compressor 40 at a position near the air inlet opening 35.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A compressor assembly for a turbocharger for a vehicle, said compressor assembly comprising:
   a rotatable shaft extending longitudinally along an axis;
   a compressor housing defining an interior and defining an air inlet portion spaced from said shaft and disposed about said axis, said air inlet portion defining an inlet diameter perpendicular to said axis; and a switchable trim compressor disposed within said interior of said compressor housing;
   a compressor wheel coupled to said shaft and disposed between said air inlet portion and said turbine wheel, with said compressor wheel rotatable by said shaft;
   an inlet adaptor housing coupled to said compressor housing;
   a ported shroud defined by said compressor housing and by said inlet housing adaptor, said ported shroud including a first port defined by said compressor housing that opens to said interior of said compressor housing between said switchable trim compressor and said compressor wheel, and a second port fluidically connected between said first port and said air inlet portion, said second port defined by said inlet adaptor housing;
   said switchable trim compressor comprising:
      an adjusting ring,
      a stationary ring, wherein said adjusting ring is rotatable relative to said stationary ring about said axis between a first position and a second position, and
      a plurality of switchable trim compressor petals disposed between, and coupled to, each of said adjusting ring and stationary ring,
   wherein said plurality of switchable trim compressor petals are positioned such that said inlet diameter is at a minimum inlet diameter while said switchable trim compressor blocks said second port to prevent fluid from flowing from said interior of said compressor housing through said first and second port to a position upstream of said switchable trim compressor near said air inlet opening when said adjusting ring is in said first position, and wherein said plurality of switchable trim compressor petals are positioned such that said inlet diameter is at a maximum inlet diameter while said second port is open to allow fluid flow from said interior of said compressor housing through said first and second port and past the switchable trim compressor on a radially exterior side of the switchable trim compressor to said position upstream of said switchable trim compressor near said air inlet opening when said adjusting ring is in said second position.

2. The compressor assembly according to claim 1, wherein said plurality of switchable trim compressor petals block said second port to prevent fluid from flowing from said interior of said compressor housing through said first and second port to said position upstream of said switchable trim compressor near said air inlet opening when said adjusting ring in said first position.

3. The compressor assembly according to claim 1, wherein a portion of each of said switchable trim compressor petals is positioned radially inwardly of an interior circumferential surface of each of said adjusting ring and said stationary ring towards said shaft when said adjusting ring in said first position.

4. The compressor assembly according to claim 1, wherein each of said plurality of switchable trim compressor petals is positioned radially outwardly of an interior circumferential surface of each of said adjusting ring and said stationary ring towards said shaft when said adjusting ring in said second position.

5. The compressor assembly according to claim 1, wherein each one of said plurality of switchable trim compressor petals includes a body portion having a protruding portion:
wherein said protruding portion of each of said plurality of switchable trim compressor petals is positioned radially inwardly of an interior circumferential surface of each of said adjusting ring and said stationary ring relative to said shaft when said adjusting ring in said first position.

6. The compressor assembly according to claim 4, wherein said protruding portion of each of said plurality of switchable trim compressor petals is positioned radially outwardly of said interior circumferential surface of each of said adjusting ring and said stationary ring relative to said shaft when said adjusting ring in said second position.

7. The compressor assembly according to claim 1, wherein each one of said plurality of switchable trim compressor petals includes a body portion having a protruding portion:
wherein said protruding portion of each of said plurality of switchable trim compressor petals is positioned radially outward of an interior circumferential surface of each of said adjusting ring and said stationary ring towards said shaft when said adjusting ring in said second position.

8. The compressor assembly according to claim 1, wherein said body portion includes a rotational peg rotatably disposed within an opening in said stationary ring and an opposing non-circular flange portion disposed within a corresponding flange opening in said adjusting ring.

9. The compressor assembly according to claim 1, wherein said adjusting ring includes a plurality of spaced apart axial extensions that extend in a direction away from said stationary ring,
wherein said inlet adaptor housing includes a plurality of axial extensions with openings defined therein, with each of said openings further defining said second port, and
wherein said plurality of spaced apart axial extensions of said adjusting ring are positioned to block each of said openings of said second port when said adjusting ring is in said first position.

10. The compressor assembly according to claim 9, wherein said plurality of spaced apart axial extensions of said adjusting ring are positioned to be unblocked from said respective corresponding one of said openings of said second port when said adjusting ring is in said second position.

11. A turbocharger for a vehicle, said turbocharger comprising: a turbine housing defining a turbine housing interior; a turbine wheel contained within said turbine housing interior; and a compressor assembly according to claim 1.

12. A turbocharger for a vehicle, said turbocharger comprising:
a turbine housing defining a turbine housing interior;
a turbine wheel contained within said turbine housing interior; and
a compressor assembly according to claim 9.

13. A method for controlling mass fluid flow in a turbocharger of a vehicle,
the turbocharger including a turbine housing defining a turbine housing interior; a turbine wheel contained within the turbine housing interior; a shaft coupled to and rotatable by the turbine wheel, the shaft extending along an axis longitudinally through the turbine housing interior; a compressor assembly including a compressor housing defining an interior and defining an air inlet portion spaced from the shaft and disposed about the axis, the air inlet portion defining an inlet diameter perpendicular to the axis; a compressor wheel coupled to the shaft and disposed between the air inlet portion and the turbine wheel, with the compressor wheel rotatable by the shaft; an inlet adaptor housing coupled to the compressor housing; and a ported shroud defined by the compressor housing and by the inlet housing adaptor for recirculating air back to the air inlet portion, the ported shroud including a first port defined within the compressor housing that opens to the interior of the compressor housing between the switchable trim compressor and the compressor wheel, and a second port fluidically connected between the first port and the air inlet portion, the second port defined by the inlet adaptor housing,
wherein the turbocharger also has a switchable trim compressor mechanism positioned between an air inlet opening of the turbocharger and a compressor wheel of the turbocharger,
said method comprising said steps of:
positioning the switchable trim compressor in a first trim position to minimize a diameter of the air inlet opening and to block fluid flow from an interior of the compressor through the first and second port of the ported shroud to a position upstream of the switchable trim compressor at a position near the air inlet opening; and
positioning the switchable trim compressor in a second trim position to increase a diameter of the air inlet opening and to allow recirculation fluid flow from an interior of the compressor assembly through the first and second port of the ported shroud and past the switchable trim compressor on a radially exterior side of the switchable trim compressor to a position upstream of the switchable trim compressor at a position near the air inlet opening.

14. The method according to claim 13, wherein the switchable trim compressor includes an adjusting ring; a stationary ring, a plurality of switchable trim compressor petals disposed between, and coupled to, each of the adjusting ring and the stationary ring; wherein the adjusting ring is rotatable relative to the stationary ring about the axis between a first position and a second position with the first position associated with the first trim position and with the second position associated with the second trim position,
and wherein said step of positioning the switchable trim compressor in a first trim position to minimize a diameter of the air inlet opening and to block fluid flow from an interior of the compressor assembly through the first and second port of ported shroud to a position upstream of the switchable trim compressor at a position near the air inlet opening comprises said step of:
rotating the adjusting ring about the axis to the first position, thereby causing the plurality of switchable trim compressor petals to move towards the shaft to decrease the inlet diameter to a minimum inlet diameter to decrease the rate of fluid flow through the air inlet opening at a given shaft rotational rate to a minimum fluid flow value,
wherein the rotating of the adjusting ring to the first position also causes the plurality of switchable trim compressor petals to block the second port to prevent recirculation fluid flow from an interior of the compressor assembly through the first and second port of ported shroud to a position upstream of the switchable trim compressor at a position near the air inlet opening.

15. The method according to claim 13, wherein said step of positioning the switchable trim compressor in a second trim position to increase a diameter of the air inlet opening and to allow recirculation fluid flow through the ported shroud from an interior of the compressor assembly through the first and second port of ported shroud to a position upstream of the switchable trim compressor at a position near the air inlet opening comprises said step of:
rotating the adjusting ring about the axis to the second position, thereby causing the plurality of switchable trim compressor petals to move away from the shaft to increase the inlet diameter to a maximum inlet diameter to increase the rate of fluid flow through the air inlet opening at a given shaft rotational rate to a maximum fluid flow value,
wherein the rotating of the adjusting ring to the second position also causes the plurality of switchable trim compressor petals to be unblock from the second port to allow recirculation fluid flow from an interior of the compressor assembly through the first and second port of ported shroud to a position upstream of the switchable trim compressor at a position near the air inlet opening.

16. The method according to claim 13, wherein the switchable trim compressor includes an adjusting ring; a stationary ring, a plurality of switchable trim compressor petals disposed between, and coupled to, each of the adjusting ring and the stationary ring; wherein the adjusting ring is rotatable relative to the stationary ring about the axis between a first position and a second position with the first position associated with the first trim position and with the second position associated with the second trim position,
wherein the adjusting ring includes a plurality of spaced apart axial extensions that extend in a direction away from the stationary ring and wherein the inlet adaptor housing includes a plurality of axial extensions with openings defined therein, with each of the openings defining the second port,
and wherein said step of positioning the switchable trim compressor in a first trim position to minimize a diameter of the air inlet opening and to block fluid flow from an interior of the compressor assembly through the first and second port of ported shroud to a position upstream of the switchable trim compressor at a position near the air inlet opening comprises said step of:
rotating the adjusting ring about the axis to the first position, thereby causing the plurality of switchable trim compressor petals to move towards the shaft to decrease the inlet diameter to a minimum inlet diameter to decrease the rate of fluid flow through the air inlet opening at a given shaft rotational rate to a minimum fluid flow value,
wherein the rotating of the adjusting ring to the first position also causes the plurality of spaced apart axial extensions of the adjusting ring to block the respective corresponding one of the openings of the second port to prevent recirculation fluid flow from an interior of the compressor assembly through the first and second port of ported shroud to a position upstream of the switchable trim compressor at a position near the air inlet opening.

17. The method according to claim 16, wherein said step of positioning the switchable trim compressor in a second trim position to increase a diameter of the air inlet opening and to allow recirculation fluid flow through the ported shroud from an interior of the compressor assembly through the first and second port of ported shroud to a position upstream of the switchable trim compressor at a position near the air inlet opening comprises said step of:
rotating the adjusting ring about the axis to the second position, thereby causing the plurality of switchable trim compressor petals to move away from the shaft to increase the inlet diameter to a maximum inlet diameter to increase the rate of fluid flow through the air inlet opening at a given shaft rotational rate to a maximum fluid flow value,
wherein the rotating of the adjusting ring to the second position also causes the plurality of spaced apart axial extensions of the adjusting ring to be unblocked from the respective corresponding one of the openings of the second port to allow recirculation fluid flow from an interior of the compressor assembly through the first and second port of ported shroud to a position upstream of the switchable trim compressor at a position near the air inlet opening.

18. The method according to claim 13, wherein the switchable trim compressor includes an adjusting ring including a plurality of spaced apart axial extensions and one or more flange openings; a guide vane mounted insert including an inner ring defining a plurality of openings, an outer ring positioned radially outward of the inner ring, with the inner and outer ring defining a channel therebetween that defines a portion of the ported shroud between the first and second ports, and a plurality of spokes coupling the inner ring to the outer ring; one or more guide vanes, each of the one or more guide vanes comprising a body portion and a projection pin, with the projection pin being inserted within a corresponding one of the plurality of openings in the inner ring; and one or more vane levers, each one of the one or more vane levers comprising a body portion, the body portion having a pair of spaced apart prong portions seated against a surface of the adjusting ring in a direction of the compressor wheel and an opposing lever arm, with one of the opposing lever arms extending within a respective one flange opening of the one or more flange openings, and wherein said step of positioning the switchable trim compressor in a first trim position to minimize a diameter of the air inlet opening and to block recirculation fluid flow from an interior of the compressor assembly through the first and second port of ported shroud to a position upstream of the switchable trim compressor at a position near the air inlet opening comprises said step of:

rotating the adjusting ring about the axis to a first position associated with the first trim position, wherein the rotational movement of the adjusting ring to the first position causes the one or more lever arms to rotate in response, thereby causing the one or more guide vanes to rotate about a projection pin axis to a closed position with a major planar surface of the body portion of each of the one or more guide vanes being normal to the axis, wherein the rotating of the adjusting ring to the first position also causes the plurality of spaced apart axial projections to block the second port to prevent recirculation fluid flow from an interior of the compressor assembly through the first and second port of ported shroud to a position upstream of the switchable trim compressor at a position near the air inlet opening.

19. The method according to claim 18, wherein said step of positioning the switchable trim compressor in a second trim position to increase a diameter of the air inlet opening and to allow recirculation fluid flow from an interior of the compressor assembly through the first and second port of ported shroud to a position upstream of the switchable trim compressor at a position near the air inlet opening comprises said step of:

rotating the adjusting ring about the axis to a second position associated with the second trim position, wherein the rotational movement of the adjusting ring to the second position causes the one or more lever arms to rotate in response, thereby causing the one or more guide vanes to rotate about a projection pin axis to an position with a major planar surface of the body portion of each of the one or more guide vanes is transverse to the axis to allow fluid flow along the major planar surface from the air inlet opening to the compressor wheel, wherein the rotating of the adjusting ring to the second position also causes the plurality of spaced apart axial projections to unblock the second port to allow recirculation fluid flow from an interior of the compressor assembly through the first and second port of ported shroud to a position upstream of the switchable trim compressor at a position near the air inlet opening.

\* \* \* \* \*